(12) United States Patent
Lee et al.

(10) Patent No.: US 12,126,029 B2
(45) Date of Patent: Oct. 22, 2024

(54) CATALYST AND METHOD OF PREPARING SAME

(71) Applicants: HYUNDAI MOTOR COMPANY, Seoul (KR); KIA MOTORS CORPORATION, Seoul (KR); Daegu Gyeongbuk Institute of Science and Technology, Daegu (KR)

(72) Inventors: Eun Jik Lee, Uiwang-si (KR); Jee Youn Hwang, Seoul (KR); Ji Hoon Jang, Suwon-si (KR); Ha Young Lee, Chungju-si (KR); Jong Sung Yu, Seoul (KR)

(73) Assignees: HYUNDAI MOTOR COMPANY, Seoul (KR); KIA MOTORS CORPORATION, Seoul (KR); DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 291 days.

(21) Appl. No.: 17/135,280

(22) Filed: Dec. 28, 2020

(65) Prior Publication Data
US 2021/0359311 A1 Nov. 18, 2021

(30) Foreign Application Priority Data

May 15, 2020 (KR) .......................... 10-2020-0058597

(51) Int. Cl.
| | |
|---|---|
| H01M 4/92 | (2006.01) |
| C25B 1/04 | (2021.01) |
| C25B 11/054 | (2021.01) |
| C25B 11/065 | (2021.01) |
| C25B 11/091 | (2021.01) |

(52) U.S. Cl.
CPC ............... *H01M 4/923* (2013.01); *C25B 1/04* (2013.01); *C25B 11/054* (2021.01); *C25B 11/065* (2021.01); *C25B 11/091* (2021.01); *H01M 4/926* (2013.01)

(58) Field of Classification Search
None
See application file for complete search history.

(56) References Cited

U.S. PATENT DOCUMENTS 9,825,308 B1 * 11/2017 Liu ..................... H01M 4/8657

FOREIGN PATENT DOCUMENTS

KR 10-0551034 B 2/2006

OTHER PUBLICATIONS

Yongde Tong et al., Interfacial coupling between noble metal nanoparticles and metal-organic frameworks for enhanced catalytic activity, Nanoscale, 2018, 10, 16425 (Year: 2018).*

(Continued)

*Primary Examiner* — Lucas J. O'Donnell
(74) *Attorney, Agent, or Firm* — Morgan, Lewis & Bockius LLP

(57) ABSTRACT

An electrode catalyst is configured such that non-noble metal particles, noble metal particles or nitride-doped noble metal particles are supported on a carbon support, wherein the carbon support has a 2D planar crystal structure or a 3D polyhedral crystal structure and is doped with nitrogen, thereby exhibiting increased catalytic activity.

8 Claims, 33 Drawing Sheets

(56) References Cited

OTHER PUBLICATIONS

Moon et al., Structural Engineering of 3D Carbon Materials from Transition Metal Ion-Exchanged Y Zeolite Templates, Chem. Mater. 2018, 30, 11, 3779-3788 (Year: 2018).*

Nana Du et al., N-doped carbon-stabilized PtCo nanoparticles derived from Pt@ZIF-67: Highly active and durable catalysts for oxygen reduction reaction, Nano Research 2017, 10(9): 3228-3237 (Year: 2017).*

Supplemental Materials cited by Nana Du et al., N-doped carbon-stabilized PtCo nanoparticles derived from Pt@ZIF-67: Highly active and durable catalysts for oxygen reduction reaction, Nano Research 2017, 10(9): 3228-3237 (Year: 2017).*

Thanh-Nhan Tran et al., "Synergistic CoN-Decorated Pt Catalyst on Two-Dimensional Porous Co-N-Doped Carbon Nanosheet for Enhanced Oxygen Reduction Activity and Durability", *ACS Appl. Energy Mater.* 2020, 3, 7, 6310-6322 (Jun. 9, 2020).

* cited by examiner

CATALYST AND METHOD OF PREPARING SAME

CROSS REFERENCE TO RELATED APPLICATION

The present application claims priority to and the benefit of Korean Patent Application No. 10-2020-0058597, filed on May 15, 2020, the entire contents of which are incorporated herein by reference.

FIELD

The present disclosure relates to a catalyst and a method of preparing the same.

BACKGROUND

The statements in this section merely provide background information related to the present disclosure and may not constitute prior art.

In order to increase the electrode reaction rate, a polymer electrolyte membrane fuel cell has to use platinum, which is a noble metal, as a catalyst. Platinum is highly priced and is limited in reserves.

Research is ongoing into catalysts in which a non-platinum transition metal for platinum replacement is joined through coordination bonding to nitrogen, and in particular, a porous-metal/organic framework is a complex composed of transition metal, nitrogen and carbon, and has superior properties due to large specific surface area, micropores, and coordination bonding of transition metal and nitrogen, and use of this complex as a non-platinum fuel cell electrode catalyst has been reported in a number of studies. However, development of non-platinum catalysts exhibiting sufficient performance is seldom reported.

When a small amount of platinum is used, carbon, having a large specific surface area and excellent pore structure, is utilized as a platinum support in order to increase the activity relative to mass through support of small-sized particles. Also, there are reports in which nitrogen, sulfur, phosphorus, etc. are added to the existing carbon structure, thus improving performance based on changes in electronic structures.

In order to reduce the use of platinum and increase the low activity of non-platinum catalysts, we have discovered that a composite catalyst in which two systems are combined is regarded as an ideal catalyst in view of both activity and price. However, the use of iron shortens the lifetime of the fuel cell due to the generation of hydroxyl radicals in side reactions.

SUMMARY

The present disclosure provides a method of preparing an electrode catalyst for a fuel cell or a water electrolysis cell, in which noble metal and non-metal metal may be efficiently applied.

The present disclosure provides an electrode catalyst in which the amount of noble metal is decreased due to the use of non-noble metal other than iron (Fe) and which has high activity.

The present disclosure provides a catalyst, including a carbon support doped with nitrogen and solid particles supported on the surface of the carbon support, in which the solid particles include particles of any one selected from the group consisting of non-noble metal particles, noble metal particles, nitride-containing noble metal particles and combinations thereof.

The carbon support may have a 2D planar crystal structure or a 3D polyhedral crystal structure.

The carbon support may have a porosity of 10% to 85%.

The nitride may include cobalt nitride.

The solid particles may include particles of any one selected from the group consisting of noble metal particles, cobalt-nitride-containing noble metal particles and combinations thereof.

The non-noble metal particles may include cobalt, and the noble metal particles may include platinum.

The catalyst may be contained in the electrode of a fuel cell or a water electrolysis cell.

In addition, the present disclosure provides a method of preparing a catalyst, including preparing a support by synthesizing a metal precursor and alkyl imidazole, preparing a carbon support doped with nitrogen by subjecting the support to primary heat treatment, subjecting the carbon support to secondary heat treatment, purifying the carbon support by removing metal particles from the carbon support through acid treatment, and preparing a composite catalyst by subjecting the carbon support to tertiary heat treatment.

The support may include ZIF-67, which is a zeolitic imidazolate framework.

The primary heat treatment may be performed at a temperature of 25° C. to 1000° C. for 10 min to 300 min in an inert gas atmosphere, and the secondary heat treatment may be performed at a temperature of 60° C. to 100° C. for 2 hr to 10 hr at a proton concentration (pH) of 7 or less.

The carbon support prepared through the primary heat treatment may include cobalt particles on the surface thereof.

The carbon support may be added to a solvent along with platinum and subjected to secondary heat treatment.

The carbon support subjected to secondary heat treatment may include, on the surface thereof, particles of any one selected from the group consisting of cobalt, nickel, platinum and combinations thereof.

The acid treatment may be performed at a temperature of 90° C. to 120° C. for 1 to 3 hr in a hydrochloric acid aqueous solution.

The metal particles removed from the carbon support through acid treatment may include pure cobalt not bound to platinum.

The tertiary heat treatment may be performed at a temperature of 300° C. to 600° C. for 10 min to 60 min in an ammonia gas atmosphere.

In addition, the present disclosure provides a method of preparing a catalyst, including preparing a support by synthesizing a metal precursor and alkyl imidazole, preparing a carbon support doped with nitrogen by subjecting the support to primary heat treatment, removing metal particles from the surface of the carbon support by subjecting the carbon support to acid treatment, and preparing a composite catalyst by subjecting the carbon support to secondary heat treatment.

The carbon support prepared through the primary heat treatment may include cobalt particles on the surface thereof, and the cobalt particles may be completely removed from the surface of the carbon support through the acid treatment.

The carbon support may be added to a solvent along with platinum and subjected to secondary heat treatment.

The carbon support subjected to secondary heat treatment may include platinum particles on the surface thereof.

According to the present disclosure, there can be provided a method of preparing an electrode catalyst for a fuel cell or a water electrolysis cell, in which noble metal and non-metal metal can be efficiently applied.

According to the present disclosure, there can be provided an electrode catalyst, in which the amount of noble metal is decreased due to the use of non-noble metal other than iron (Fe) and which has high activity.

The effects of the present disclosure are not limited to the foregoing, and should be understood to include all effects that can be reasonably anticipated from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
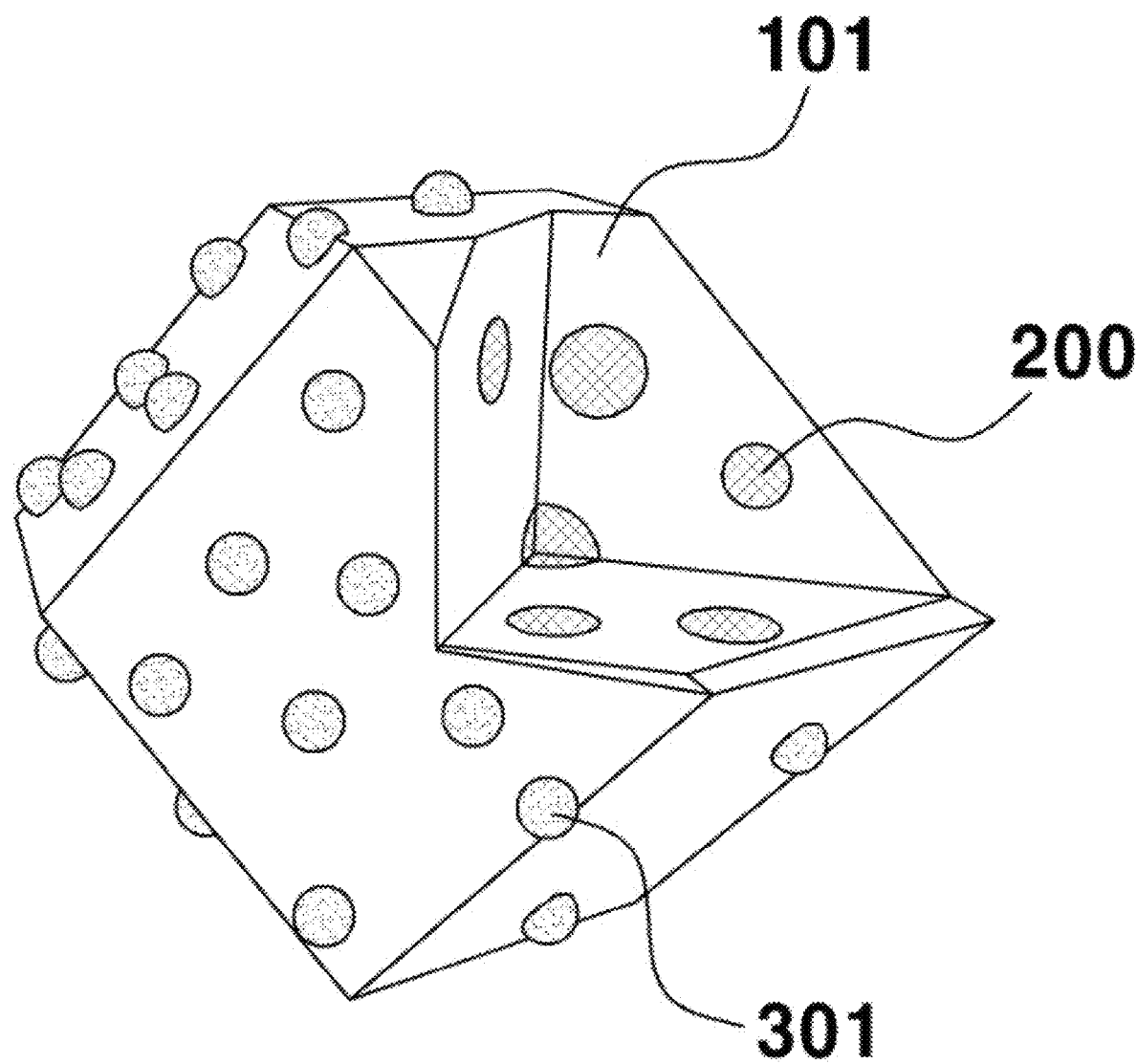
FIG. 1 shows a catalyst including nitride-containing noble metal particles and a carbon support doped with nitrogen in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

The present disclosure pertains to a catalyst and a method of preparing the same. Specifically, the present disclosure pertains to an electrode catalyst configured such that non-noble metal particles, noble metal particles or nitride-containing noble metal particles are supported on a carbon support having a 2D planar crystal structure or a 3D polyhedral crystal structure and doped with nitride, thereby exhibiting increased catalytic activity.

FIGS. 1 to 4 show the configurations of the catalyst of the present disclosure. With reference to these drawings, the catalyst of the present disclosure is described, and with reference to FIGS. 5 to 10, the method of preparing the catalyst of the present disclosure is described stepwise.

Catalyst

The catalyst of the present disclosure includes a support and solid particles supported on the surface of the support. Here, the solid particles may include particles of any one selected from the group consisting of non-noble metal particles, noble metal particles, nitride-containing noble metal particles and combinations thereof.

In one form, the support of the present disclosure is a carbon support doped with nitrogen.

The support of the present disclosure may have a 2D planar crystal structure or a 3D polyhedral crystal structure, as desired.

Figure 2:
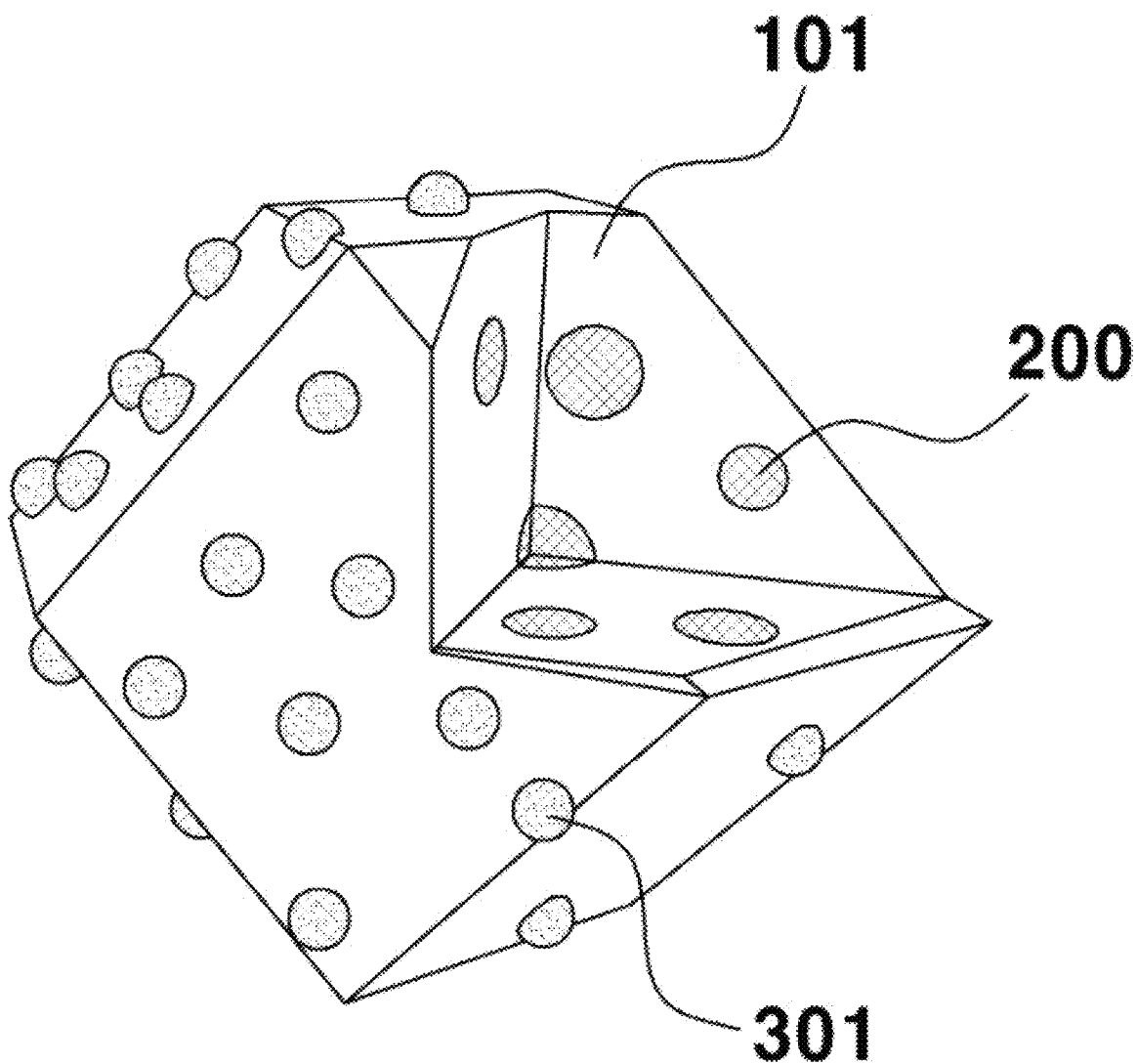
FIG. 2 shows a catalyst including noble metal particles and a carbon support doped with nitrogen in one form of the present disclosure.
Figure 3:
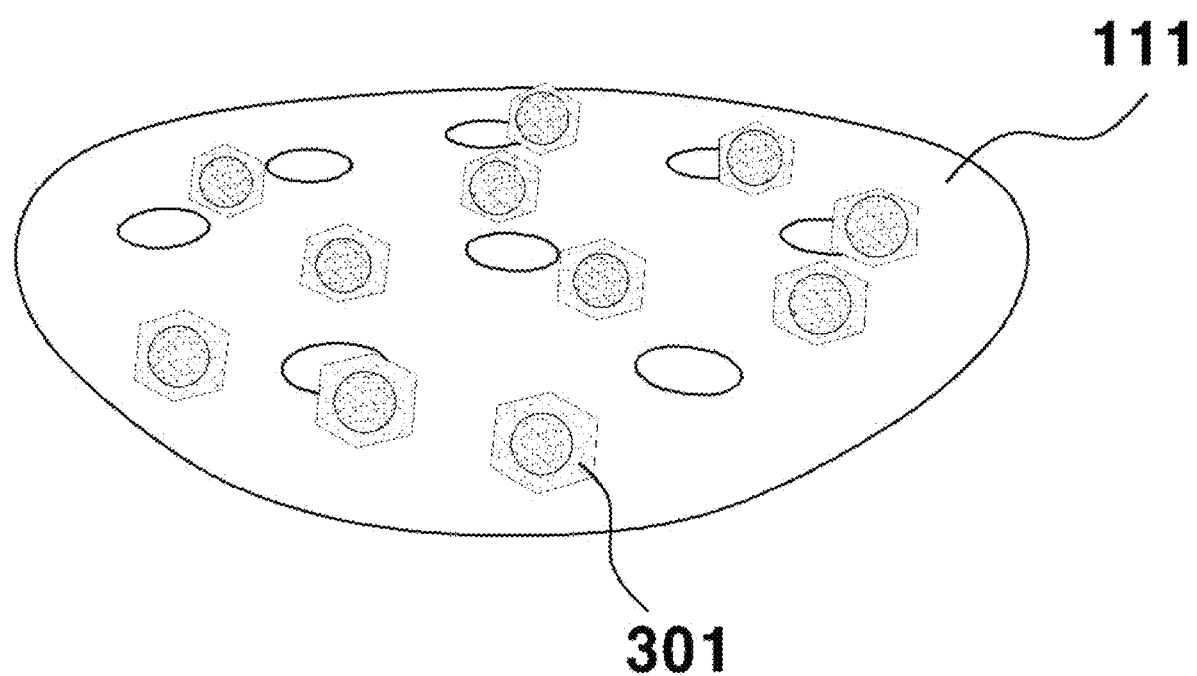
FIG. 3 shows a catalyst including nitride-containing noble metal particles and a carbon support doped with nitrogen having a 2D planar crystal structure in one form of the present disclosure.
Figure 4:
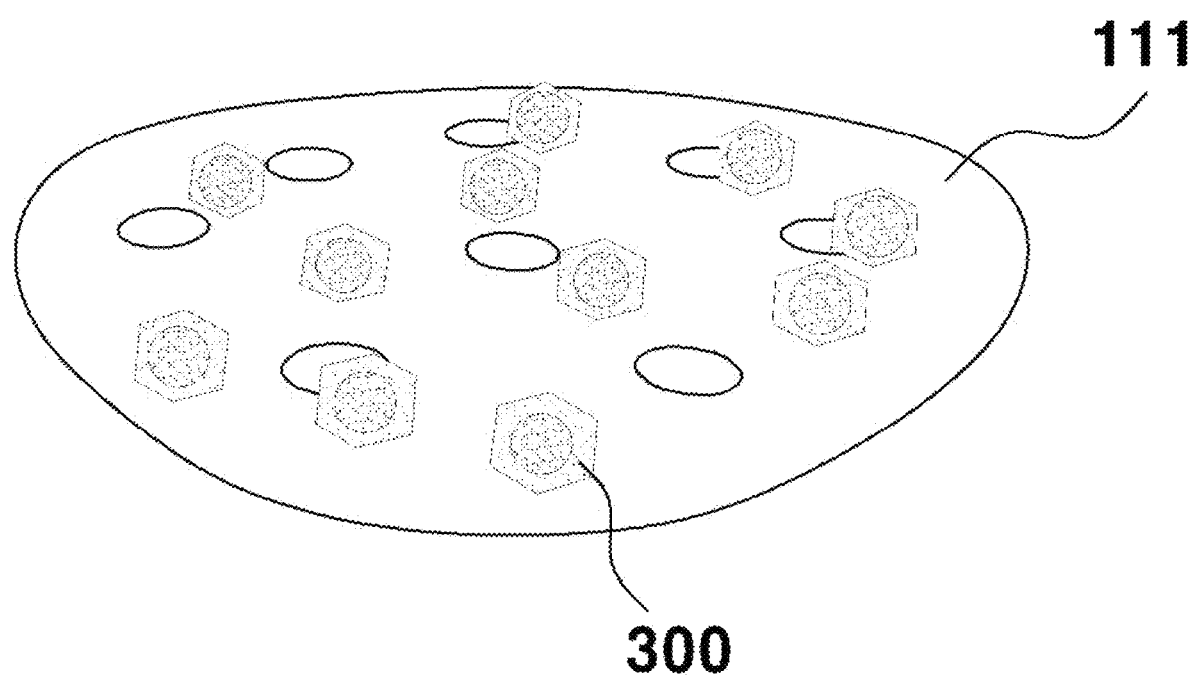
FIG. 4 shows a catalyst including noble metal particles and a carbon support doped with nitrogen having a 2D planar crystal structure in one form of the present disclosure.

FIGS. 1 and 2 illustrate a catalyst including a carbon support having a 3D polyhedral crystal structure and doped with nitrogen, and FIGS. 3 and 4 illustrate a catalyst including a carbon support having a 2D planar crystal structure and doped with nitrogen.

The catalyst of the present disclosure includes a support, and particles of any one selected from the group consisting of a non-noble metal, noble metal, nitride-containing noble metal and combinations thereof, which are attached to the surface of the support. The particles disposed on the support may be selected as desired, and include a nitride-containing noble metal due to the beneficial effect thereof. Here, the nitride may include cobalt nitride, the non-noble metal may include cobalt, and the noble metal may include platinum.

FIG. 1 shows the catalyst according to one form of the present disclosure (CoN-Pt/CoNC-bulk) including nitride-containing noble metal particles 301 and a carbon support 101 doped with nitrogen, and FIG. 2 shows the catalyst according to another form of the present disclosure (Pt/CoNC-bulk) including noble metal particles 300 and a carbon support 101 doped with nitrogen.

The carbon support of FIGS. 1 and 2 has a 3D polyhedral crystal structure. In one form, the diameter of the carbon support is approximately 20 to 1000 nm. Also, the porosity of the carbon support is approximately 30 to 85%.

FIG. 3 shows the catalyst according to still another form of the present disclosure (CoN-Pt/CoNC-2D) including nitride-containing noble metal particles 301 and a carbon support 111 doped with nitrogen having a 2D planar crystal structure, and FIG. 4 shows the catalyst according to yet another form of the present disclosure (Pt/CoNC-2D) including noble metal particles 300 and a carbon support 111 doped with nitrogen having a 2D planar crystal structure.

The carbon support of FIGS. 3 and 4 has a 2D planar crystal structure. Here, the thickness of the carbon support is 10 to 200 nm and the diameter thereof is 30 to 5000 nm. Also, the carbon support has a porosity of 10 to 60%.

The method of preparing the electrode catalyst of the present disclosure may be classified into two types depending on the kind of particles provided on the support. The method of preparing the catalyst of the present disclosure may be classified into a method of preparing an electrode catalyst including nitride-containing noble metal particles and a method of preparing an electrode catalyst including noble metal particles.

Method of Preparing Catalyst Including Nitride-Containing Noble Metal Particles

The method of preparing a catalyst including nitride-containing noble metal particles according to the present disclosure may include preparing a support by synthesizing a metal precursor and alkyl imidazole, preparing a carbon support having an exposed non-noble metal and doped with nitrogen by subjecting the support to primary heat treatment, subjecting the carbon support to secondary heat treatment, purifying the carbon support by removing metal particles from the surface of the carbon support having the exposed non-noble metal through acid treatment, and preparing a composite catalyst by subjecting the carbon support not containing the metal particles to tertiary heat treatment.

Figure 5:
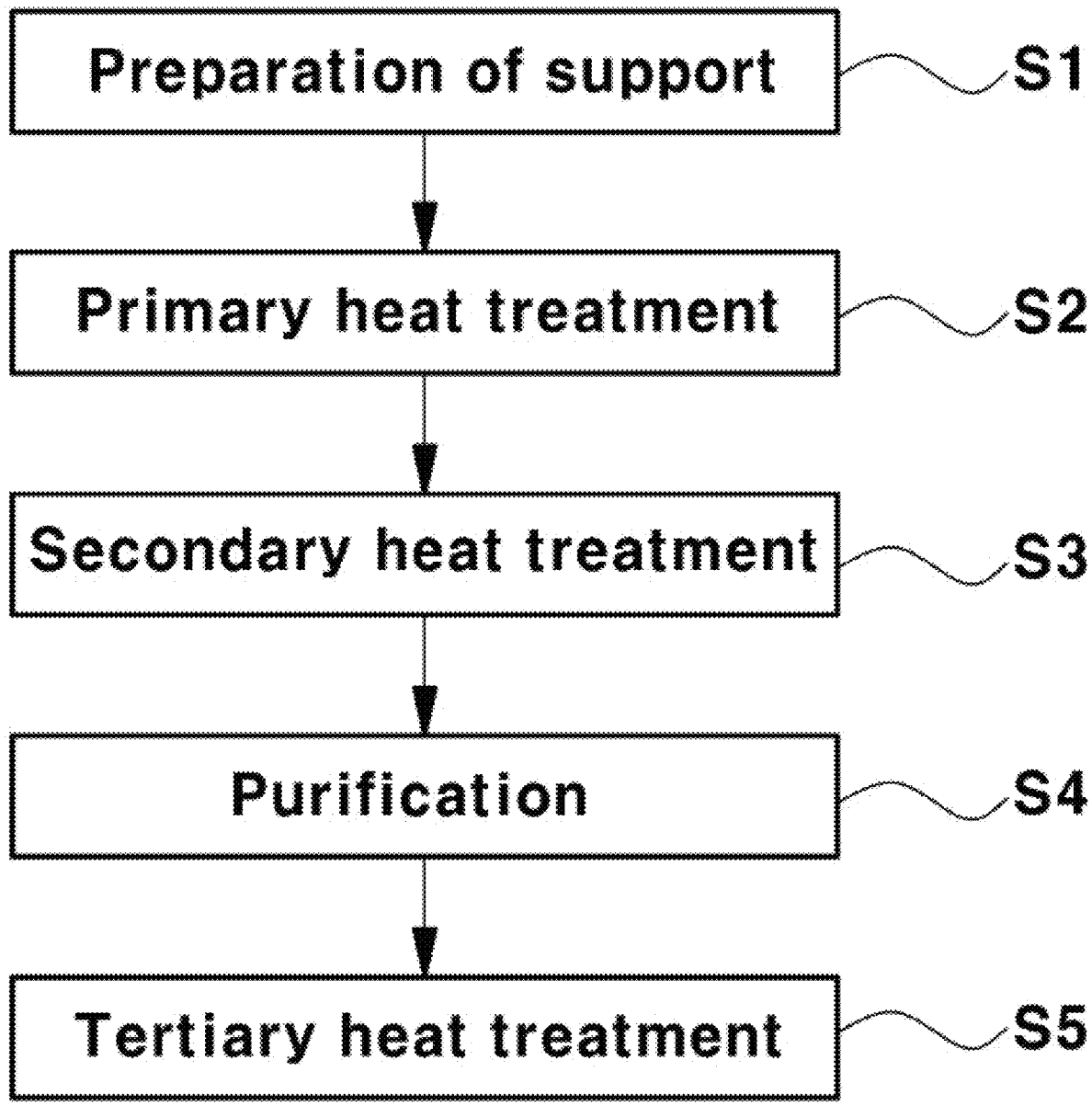
FIG. 5 is a flowchart showing a process of preparing an electrode catalyst including nitrogen-doped noble metal particles according to one form the present disclosure.
Figure 6:
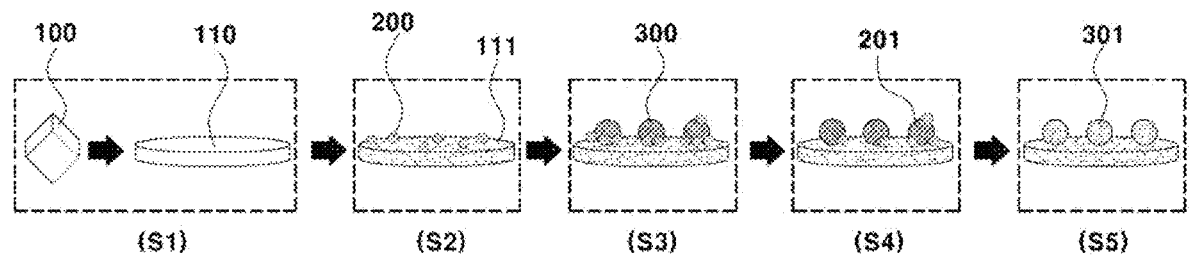
FIG. 6 shows a process of preparing a catalyst by converting a support so as to have a 2D planar crystal structure.
Figure 7:
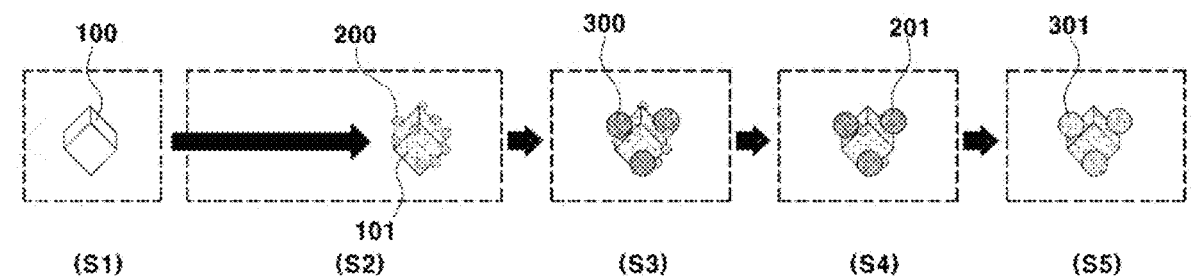
FIG. 7 shows a process of preparing a catalyst using a support having a 3D crystal structure.

FIG. 5 is a flowchart showing the process of preparing the electrode catalyst of the present disclosure, and FIGS. 6 and 7 show the catalyst preparation process according to various forms. With reference to FIGS. 5 to 7, the steps thereof are described below.

Preparation of Support (S1)

A support 100 is prepared by synthesizing a metal precursor and alkyl imidazole.

In one form of the present disclosure, the metal precursor may include cobalt nitrate hydrate ($Co(NO_3)_2.6H_2O$), and the alkyl imidazole includes 2-methylimidazole.

The support 100 includes a zeolitic imidazolate framework (ZIF) having a 3D polyhedral crystal structure, and ZIF-67 ($Co(C_4N_2H_5)_2$).

The support 100 includes carbon, nitrogen, hydrogen and cobalt, and in another form, the support 100 is configured such that carbon, nitrogen and hydrogen constitute the basic backbone of the support 100 and cobalt is joined through coordination bonding to a portion of nitrogen contained in the basic backbone.

In the present disclosure, the support 100 may be imparted with a 2D planar crystal structure by converting the crystal structure, as desired.

The support 110 having a 2D planar crystal structure is prepared by adding the support 100 having a 3D polyhedral crystal structure and cobalt nitrate hydrate to a solvent and carrying out a hydrothermal reaction. Here, the solvent includes methanol. The weight ratio of the support 100 and the cobalt nitrate hydrate, which are added to the solvent, is 1:1 to 1:3.

The hydrothermal reaction may be performed at a temperature of 140° C. to 180° C. for 30 min to 5 hr, and 150° C. to 160° C. for 1 hr to 2 hr.

FIG. 6 shows the process of preparing the catalyst using the support 110 having the converted 2D planar crystal structure, and FIG. 7 shows the process of preparing the catalyst using the support 100 having a 3D polyhedral crystal structure without performing the hydrothermal reaction.

In the present disclosure, the shape of the support 100 determines the shape of the final catalyst, and the use of a support 110 having a 2D planar crystal structure may be desired for the purpose of the present disclosure.

For the sake of description, in the present disclosure, the process of preparing the catalyst as shown in FIG. 6 is described.

Primary Heat Treatment (S2)

The support 110 is subjected to primary heat treatment to afford a carbon support 111 that has an exposed non-noble metal and is doped with nitrogen. Specifically, the support 110 is heat-treated in an inert gas atmosphere, so the non-noble metal particles 200 are provided on the support 110 and the support 110 is converted into a carbon support 111 doped with nitrogen.

In the present disclosure, the non-noble metal particles 200 provided on the support 110 include cobalt. Here, the cobalt provided on the support 110 is derived from cobalt ions joined through coordination bonding to nitrogen in a conventional support. Specifically, during carbonization through primary heat treatment, the cobalt ions joined through coordination bonding are reduced, and thus cobalt is deposited on the surface of the carbon support 111.

In the present disclosure, the nitrogen that is doped is derived from nitrogen that is bound to carbon in a conventional support to constitute the basic backbone. Specifically, during carbonization through primary heat treatment, the carbon lattice is doped with nitrogen. Here, cobalt is deposited on the surface of carbon doped with nitrogen.

In one form, the primary heat treatment may be performed at a temperature of 25° C. to 1000° C. for 10 min to 300 min, and the inert gas may include nitrogen ($N_2$).

In another form, the primary heat treatment is performed at 800° C. for 30 min to 120 min under conditions such that the temperature is elevated from 25° C. to 800° C. at a rate of 5° C./min in a nitrogen gas atmosphere.

Secondary Heat Treatment (S3)

The carbon support 111 doped with nitrogen and the non-noble metal particles 200 on the carbon support 111 are heat-treated. Specifically, the carbon support 111 including the non-noble metal particles 200 on the surface thereof and doped with nitrogen is added together with the noble metal to a solvent to afford a mixture, which is then heat-treated.

In the present disclosure, the noble metal that is added is supported on the surface of the non-noble metal particles 200 supported on the carbon support 111 doped with nitrogen through a galvanic conversion reaction.

The noble metal that is added to the solvent is used in the form of an ionic solution, and the solution includes platinum ions. Here, platinum is provided in the form of chloroplatinic acid ($H_2PtCl_6$). Specifically, the platinum ions are reduced on the non-noble metal particles 200 and deposited in the form of particles, and some of the non-noble metal particles 200 are oxidized and dissolved in the form of ions in the solvent.

The solvent may include ethylene glycol (EG).

The proton concentration (pH) of the mixture is approximately 7 or less.

The heat treatment is performed at a temperature of 60° C. to 100° C. for 2 hr to 10 hr.

Due to the heat treatment of the present disclosure, the carbon support 111 doped with nitrogen includes, on the surface thereof, particles of any one selected from the group consisting of non-noble metal, noble metal and combinations thereof. Here, the non-noble metal particles may include cobalt and the noble metal particles may include platinum.

Purification (S4)

The carbon support 111 having the exposed non-noble metal and doped with nitrogen is subjected to acid treatment to thus remove metal particles from the surface thereof, so the carbon support is purified. Specifically, in the purification step, pure non-noble metal particles 200 are removed from the carbon support 111 doped with nitrogen through acid treatment, and only the non-noble metal particles 201 on the noble metal particles 300 remain. Here, the pure non-noble metal particles 200 are non-noble metal particles that are neither attached to nor in contact with any noble metal particles in the present disclosure.

The acid treatment is performed by dispersing the washed carbon support 111 in a solvent including an acid and conducting a hydrothermal reaction. Specifically, in the purification step, the carbon support 111 doped with nitrogen, obtained through secondary heat treatment, is washed with distilled water and ethanol, dried, and dispersed in the solvent, and a hydrothermal reaction is carried out. Here, the solvent that is used may include hydrochloric acid, and the hydrothermal reaction may be carried out at a temperature of 90° C. to 120° C. for 1 hr to 3 hr.

Through the hydrothermal reaction in the solvent including hydrochloric acid, the non-noble metal particles 200 are removed from the surface of the carbon support 111, and some of the non-noble metal particles 201 present on the noble metal particles 300 are removed.

Tertiary Heat Treatment (S5)

The carbon support 111 including, on the surface thereof, the noble metal particles 300 including the non-noble metal particles 201 and doped with nitrogen is subjected to tertiary heat treatment, thus preparing a composite catalyst. Specifically, the carbon support 111 including, on the surface thereof, platinum particles, some of which include cobalt particles, and doped with nitrogen is subjected to tertiary heat treatment in an ammonia ($NH_3$) gas atmosphere, thus obtaining a composite catalyst.

The ammonia is synthesized into nitride during the heat treatment along with the non-noble metal particles 201 formed on the surface of the noble metal particles 300. The tertiary heat treatment in an ammonia gas atmosphere enables the formation of nitride on the surface of the noble metal particles 300.

The nitride includes cobalt nitride.

The tertiary heat treatment may be performed at a temperature of 300° C. to 600° C. for 10 min to 60 min in an ammonia gas atmosphere.

Through the heat treatment, a composite catalyst including the nitride-containing noble metal particles 301 and the carbon support 111 doped with nitrogen including the nitride-containing noble metal particles 301 on the surface thereof may be prepared.

Method of Preparing Catalyst Including Noble Metal Particles

The method of preparing an electrode catalyst including noble metal particles according to the present disclosure may include preparing a support by synthesizing a metal precursor and alkyl imidazole, preparing a carbon support having an exposed non-noble metal and doped with nitrogen by subjecting the support to primary heat treatment, purifying the carbon support by removing metal particles from the surface of the carbon support through acid treatment, and preparing a composite catalyst by subjecting the carbon support to secondary heat treatment.

Figure 8:
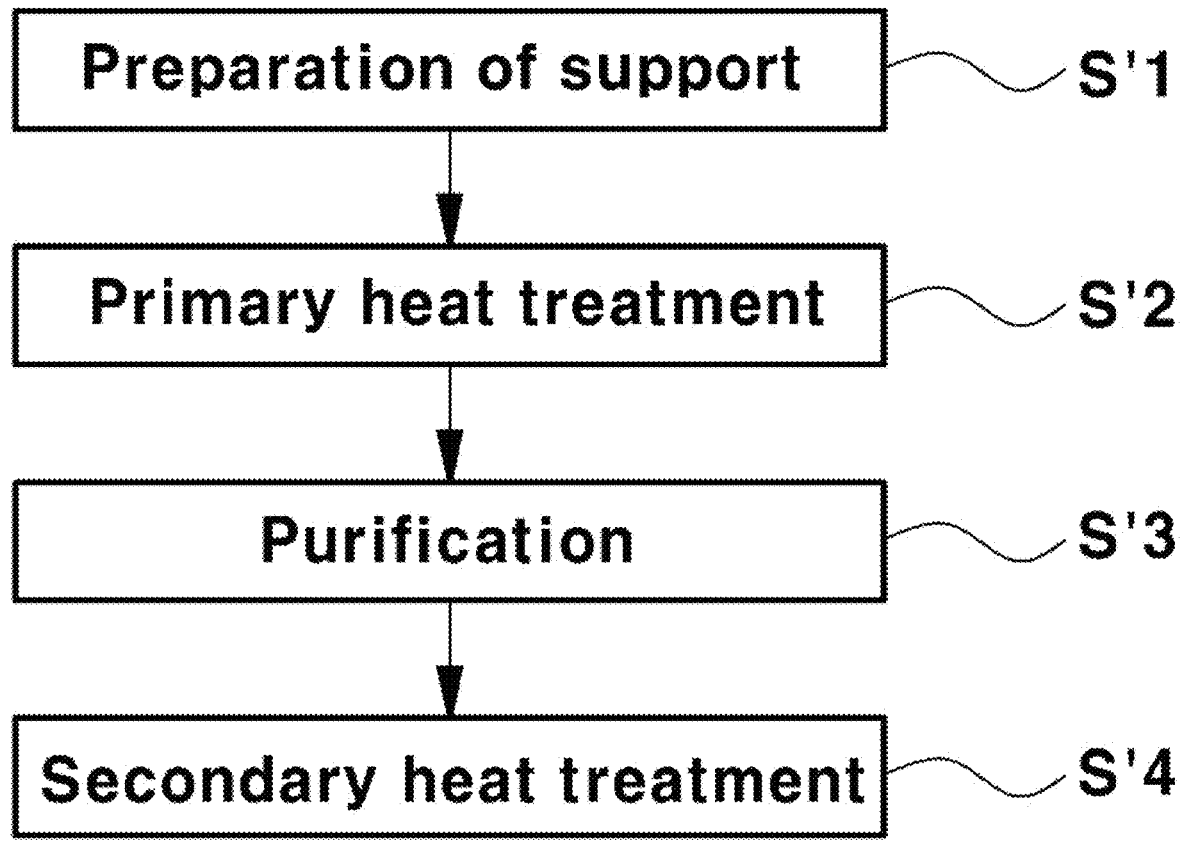
FIG. 8 is a flowchart showing a process of preparing an electrode catalyst including noble metal particles.
Figure 9:
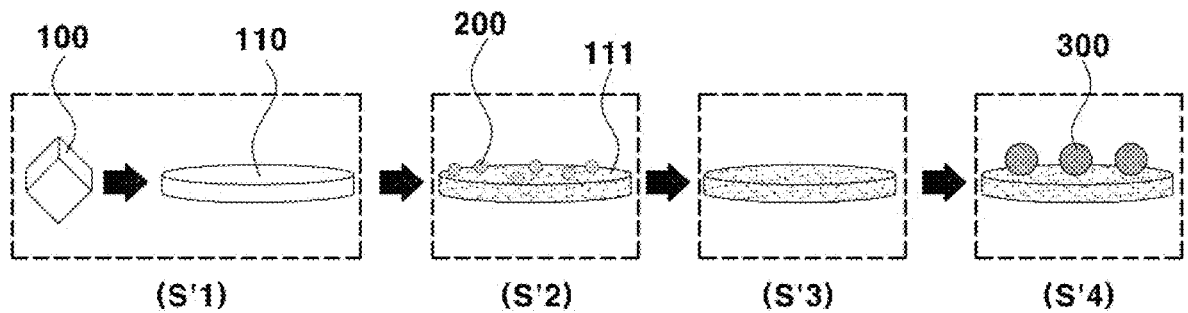
FIG. 9 shows a process of preparing a catalyst by converting a support so as to have a 2D planar crystal structure.
Figure 10:
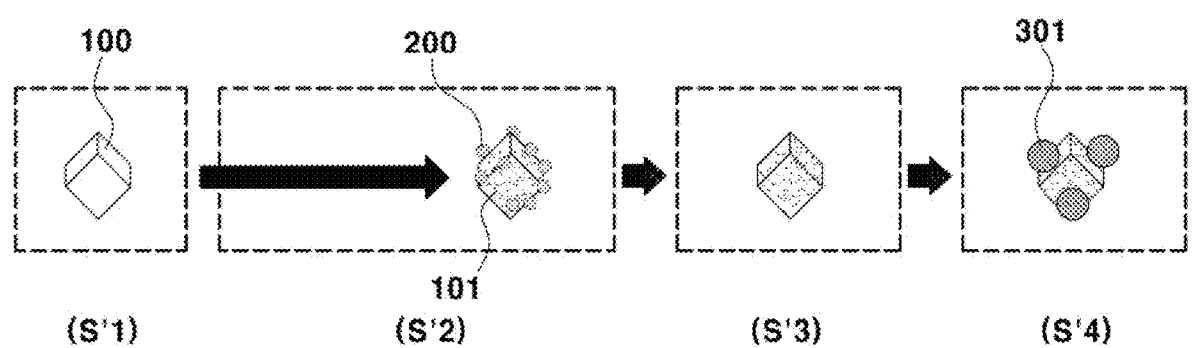
FIG. 10 shows a process of preparing a catalyst using a support having a 3D crystal structure.

FIG. 8 is a flowchart showing the process of preparing the electrode catalyst according to the present disclosure, and FIGS. 9 and 10 show the catalyst preparation process according to various forms. With reference to FIGS. 8 to 10, the steps thereof are described below.

Preparation of Support (S'1)

A support 100 is prepared by synthesizing a metal precursor and alkyl imidazole. The present step is the same as the step of preparing the support (S1) in the method of preparing the electrode catalyst including nitride-doped noble metal particles described above, and thus a description thereof is omitted. For the sake of description, the process of preparing the catalyst as shown in FIG. 9 is described.

Primary Heat Treatment (S'2)

A carbon support 111 including non-noble metal particles 200 on the surface thereof and doped with nitrogen is prepared by subjecting the support 100 to primary heat treatment. The present step is the same as the primary heat treatment step (S2) in the method of preparing the electrode catalyst including nitride-doped noble metal particles described above, and thus a description thereof is omitted.

Purification (S'3)

The carbon support 111 doped with nitrogen is subjected to acid treatment, thus removing metal particles from the surface thereof. Specifically, the acid treatment enables the removal of the non-noble metal particles 200 formed on the carbon support 111 in the primary heat treatment step, thereby affording a carbon support 111 doped with nitrogen.

In the present disclosure, the non-noble metal particles 200 that are removed are cobalt particles.

In the present step, the acid treatment is performed in a manner in which the carbon support 111, including the non-noble metal particles 200 on the surface thereof and doped with nitrogen, is dispersed in the solvent and a hydrothermal reaction is carried out. Here, the solvent includes hydrochloric acid, and the hydrothermal reaction is conducted at a temperature of 90° C. to 120° C. for 1 hr to 3 hr.

The hydrothermal reaction enables the formation of a carbon support 111 not including any metal particles on the surface thereof and doped with nitrogen.

Secondary Heat Treatment (S'4)

The carbon support 111 not including any metal particles on the surface thereof and doped with nitrogen is subjected to secondary heat treatment to afford a composite catalyst including the carbon support 111 including noble metal particles 300 on the surface thereof and doped with nitrogen. Specifically, the carbon support 111 is added to a solvent together with the noble metal to form a mixture, which is then heat-treated. Here, the solvent may include ethylene glycol (EG).

The proton concentration (pH) of the mixture is 7 or less.

The heat treatment is performed at a temperature of 60° C. to 150° C. for 2 hr to 10 hr.

Through the heat treatment of the present disclosure, the carbon support 111 doped with nitrogen may include only the noble metal particles 300 on the surface thereof. Here, the noble metal particles 300 include platinum.

Electrode

In the present disclosure, an electrode including the catalyst prepared by the catalyst preparation method described above is provided. More specifically, the catalyst of the present disclosure may be included in the electrode for a fuel cell or a water electrolysis cell.

The catalyst may include an electrode catalyst including a carbon support including nitride-containing noble metal particles on the surface thereof and doped with nitrogen, or an electrode catalyst including a carbon support including noble metal particles on the surface thereof and doped with nitrogen.

A better understanding of the present disclosure will be given through the following examples. However, these examples are merely set forth to illustrate the present disclosure, and are not to be construed as limiting the scope of the present disclosure.

PREPARATION EXAMPLE 1

CoN-Pt/CoNC-2D

An aqueous solution, obtained by dissolving a metal precursor $Co(NO_3)_2 \cdot 6H_2O$ (3.1 mmol) in 6 ml of distilled water, was supplied at a rate of 5 ml/h and mixed with an aqueous solution of 2-methylimidazole (12.2 mmol) in 40 ml of distilled water with stirring, after which the resulting mixed solution was stirred for 6 hr, centrifuged and dried, thus synthesizing a support having a polyhedral crystal structure (ZIF-67).

The ZIF-67 (0.5 g) was uniformly mixed with a cobalt nitrate hydrate $Co(NO_3)_2 \cdot 6H_2O$ (1.0 g) and methanol, followed by hydrothermal reaction at 160° C. for 2 hr, whereby the support was converted so as to have a 2D planar crystal structure.

The temperature of the support having the converted crystal structure (2.0 g) was elevated from 25° C. to 800° C. at a rate of 5° C./min in an inert gas ($N_2$) atmosphere, followed by heat treatment at 800° C. for 1 hr, thus forming a carbon support (Co/CoNC-2D) including cobalt non-noble metal particles on the surface thereof and doped with nitrogen.

The carbon support (Co/CoNC-2D) (0.1 g) was mixed with a platinum solution (40 μl, 1.93 M) in an ethylene glycol solvent (EG, 40 ml), after which the pH thereof was adjusted to about 7 using a KOH aqueous solution, followed by stirring, heat treatment at 80° C. for 8 hr, washing with distilled water and ethanol, drying, dispersion in a 0.5 M hydrochloric acid aqueous solution, and hydrothermal reaction at 100° C. for 2 hr, thus removing pure cobalt non-noble metal particles from the surface of the carbon support, after which drying was performed, thereby preparing a carbon support configured such that cobalt non-noble metal particles including platinum particles attached thereto were attached to the surface thereof.

Thereafter, heat treatment was performed at 500° C. for 30 min in an ammonia atmosphere, thereby preparing an electrode catalyst (CoN-Pt/CoNC-2D) including a carbon support doped with nitrogen and cobalt-nitride-containing platinum particles attached to the surface of the carbon support.

Figure 11A:
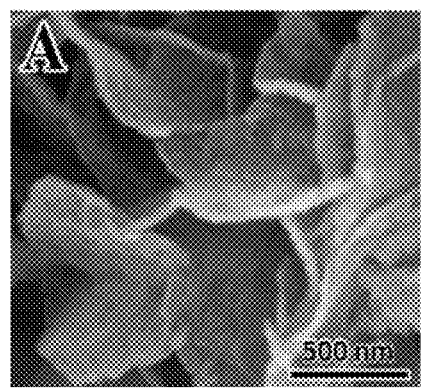
FIGS. 11A to 11C show the results of observation of the electrode catalyst of Preparation Example 1 using scanning electron microscopy, transmission electron microscopy and high-resolution transmission electron microscopy.
Figure 11B:
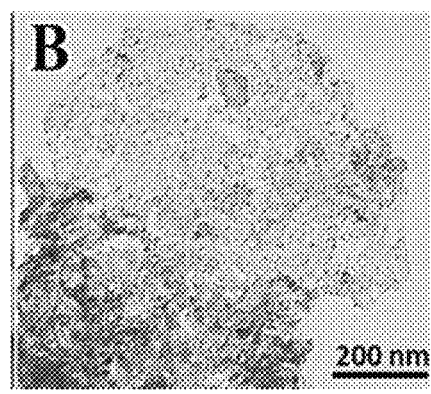
Figure 11C:
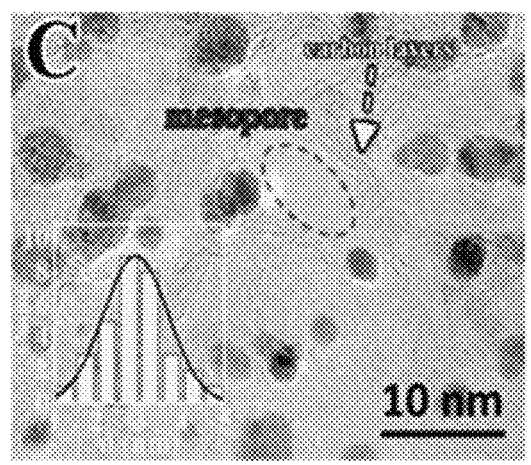
Figure 12A:
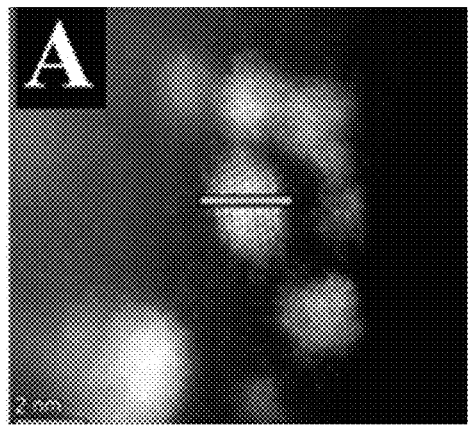
FIGS. 12A to 12F show the results of energy-dispersive X-ray spectroscopy of the electrode catalyst of Preparation Example 1.
Figure 12B:
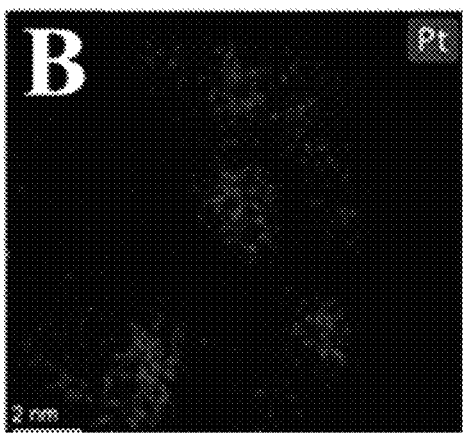
Figure 12C:
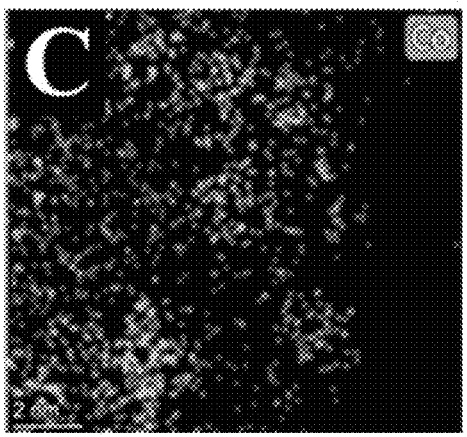
Figure 12D:
Figure 12E:
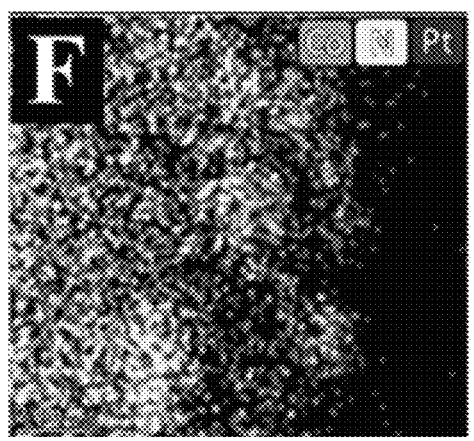
Figure 12F:
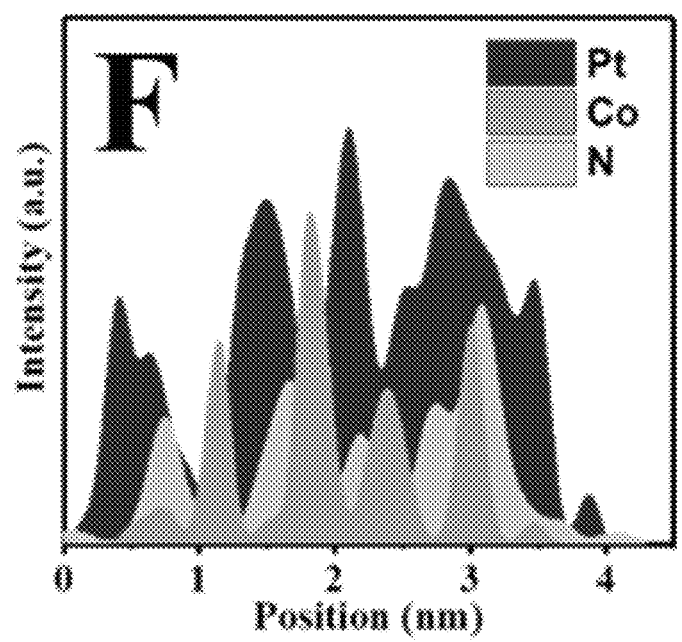

FIG. 11A shows a scanning electron microscope (SEM) image of the electrode catalyst prepared above, FIG. 11B shows a transmission electron microscope (TEM) image thereof, and FIG. 11C shows a high-resolution TEM image thereof and a platinum particle size distribution.

With reference to FIGS. 11A to 11C, the carbon support included in the electrode catalyst has a 2D planar crystal structure, pores therein, and uniform distribution of platinum particles having a size of 2 to 4 nm.

FIGS. 12A to 12F show the results of qualitative and quantitative analysis of the surface of the electrode catalyst prepared above using energy-dispersive X-ray spectroscopy (EDS).

With reference to FIGS. 12A to 12F, it can be seen that platinum, cobalt and nitrogen were uniformly distributed on the carbon support and also that cobalt and nitrogen were mainly superimposed at the location at which the platinum particles were distributed, based on which the platinum can be inferred to include cobalt nitride on the surface thereof.

Based on the results of an EDS line-scanning profile limited to one particle (FIG. 12F), it can be confirmed that the particles were composed mainly of platinum and included cobalt nitride on the surface thereof.

PREPARATION EXAMPLE 2

CoN-Pt/CoNC-Bulk

An aqueous solution, obtained by dissolving a metal precursor $Co(NO_3)_2 \cdot 6H_2O$ (3.1 mmol) in 6 ml of distilled water, was supplied at a rate of 5 ml/h and mixed with an aqueous solution of 2-methylimidazole (12.2 mmol) in 40 ml of distilled water with stirring, after which the resulting mixed solution was stirred for 6 hr, centrifuged, and dried, thus synthesizing a support having a polyhedral crystal structure (ZIF-67).

The temperature of the support (2.0 g) was elevated from 25° C. to 800° C. at a rate of 5° C./min in an inert gas ($N_2$) atmosphere, followed by heat treatment at 800° C. for 1 hr, thus forming a carbon support (Co/CoNC-bulk) including cobalt non-noble metal particles on the surface thereof and doped with nitrogen.

The carbon support (Co/CoNC-bulk) (0.1 g) was mixed with a platinum solution (40 µl, 1.93 M) in an ethylene glycol solvent (EG, 40 ml), after which the pH thereof was adjusted to about 7 using a KOH aqueous solution, followed by stirring, heat treatment at 80° C. for 8 hr, washing with distilled water and ethanol, drying, dispersion in a 0.5 M hydrochloric acid aqueous solution, and hydrothermal reaction at 100° C. for 2 hr, thus removing pure cobalt non-noble metal particles from the surface of the carbon support, after which drying was performed, thereby preparing a carbon support configured such that platinum particles including cobalt non-noble metal particles were attached to the surface thereof.

Thereafter, heat treatment was performed at 500° C. for 30 min in an ammonia atmosphere, thereby preparing an electrode catalyst (CoN-Pt/CoNC-bulk) including a carbon support including cobalt-nitride-containing platinum particles attached to the surface thereof and doped with nitrogen.

Figure 13A:
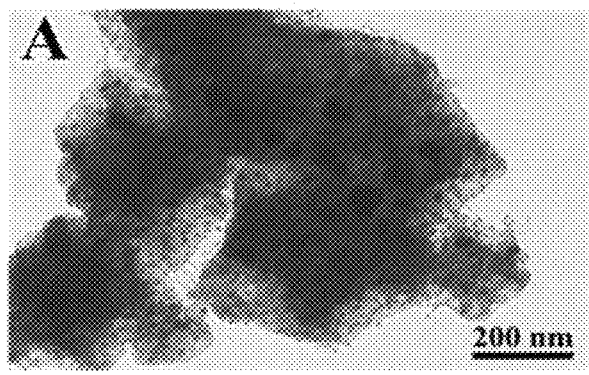
FIGS. 13A to 13F show the results of observation of the electrode catalyst of Preparation Example 2 using transmission electron microscopy, high-angle annular dark-field scanning transmission electron microscopy and energy-dispersive X-ray spectroscopy.
Figure 13B:
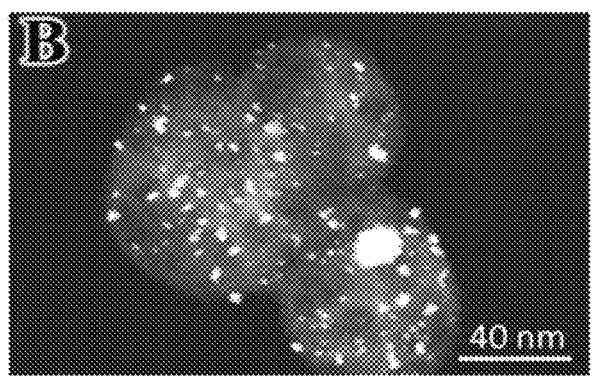
Figure 13C:
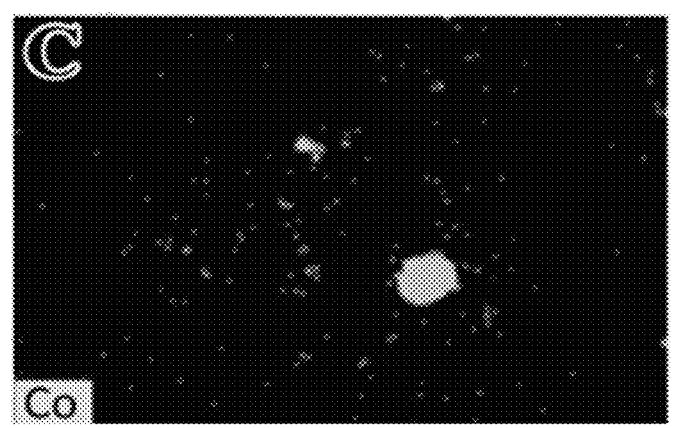
Figure 13D:
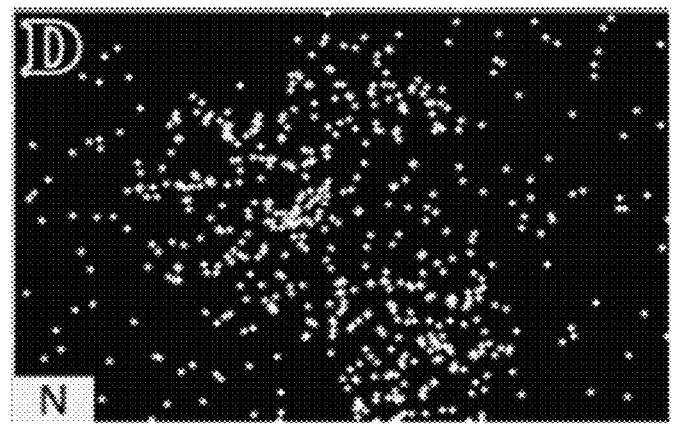
Figure 13E:
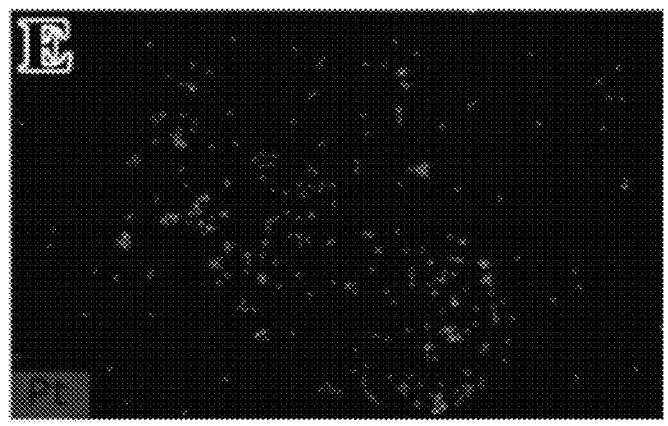
Figure 13F:
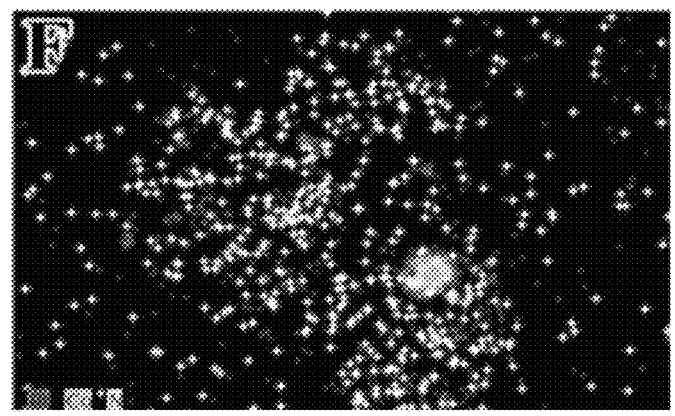

FIG. 13A shows a TEM image of the electrode catalyst prepared above, FIG. 13B shows a high-angle annular dark-field scanning transmission electron microscopy (HAADF-STEM) image thereof, and FIGS. 13C to 13F show the results of surface qualitative analysis using energy-dispersive X-ray spectroscopy (EDS).

With reference to FIGS. 13A to 13F, it can be confirmed that the electrode catalyst included the support having a 3D polyhedral crystal structure, and also that the platinum particles were distributed on the support, cobalt and nitrogen were uniformly distributed throughout the catalyst, and cobalt and nitrogen were superimposed on some of the platinum particles that were distributed, indicating that cobalt nitride was formed on the platinum particles.

PREPARATION EXAMPLE 3

Pt/CoNC-2D

An aqueous solution, obtained by dissolving a metal precursor $Co(NO_3)_2 \cdot 6H_2O$ (3.1 mmol) in 6 ml of distilled water, was supplied at a rate of 5 ml/h and mixed with an aqueous solution of 2-methylimidazole (12.2 mmol) in 40 ml of distilled water with stirring, after which the resulting mixed solution was stirred for 6 hr, centrifuged, and dried, thus synthesizing a support having a polyhedral crystal structure (ZIF-67).

The ZIF-67 (0.5 g) was uniformly mixed with a cobalt nitrate hydrate $Co(NO_3)_2 \cdot 6H_2O$ (1.0 g) and methanol, followed by hydrothermal reaction at 160° C. for 2 hr, whereby the support was converted so as to have a 2D planar crystal structure.

The temperature of the support having the converted crystal structure (2.0 g) was elevated from 25° C. to 800° C. at a rate of 5° C./min in an inert gas ($N_2$) atmosphere, followed by heat treatment at 800° C. for 1 hr, thus forming a carbon support (Co/CoNC-2D) including cobalt non-noble metal particles on the surface thereof and doped with nitrogen.

The carbon support thus obtained was washed with distilled water and ethanol, dried, dispersed in a 0.5 M hydrochloric acid aqueous solution, and subjected to a hydrothermal reaction at 100° C. for 2 hr, thus removing pure cobalt non-noble metal particles from the surface of the carbon support, after which drying was performed, thereby obtaining a carbon support not including metal particles on the surface thereof.

The carbon support (CoNC-2D) (0.1 g) was mixed with a platinum solution (40 µl, 1.93 M) in an ethylene glycol solvent (EG, 40 ml), after which the pH thereof was adjusted to about 7 using a KOH aqueous solution, followed by stirring and heat treatment at 140° C. for 8 hr, thus preparing an electrode catalyst (Pt/CoNC-2D) including a carbon support doped with nitrogen and platinum particles attached to the surface of the carbon support.

Figure 14A:
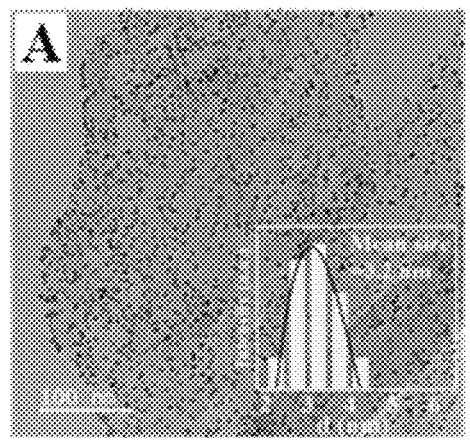
FIGS. 14A to 14G show the results of observation of the electrode catalyst of Preparation Example 3 using transmission electron microscopy, high-angle annular dark-field scanning transmission electron microscopy and energy-dispersive X-ray spectroscopy.
Figure 14B:
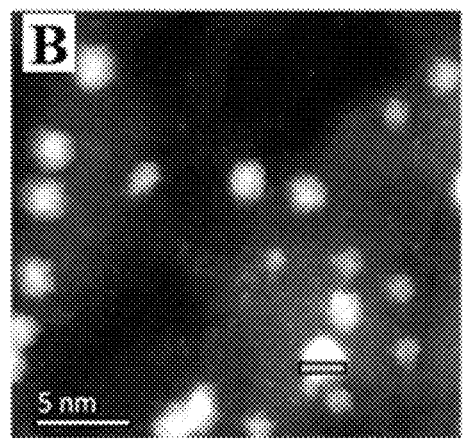
Figure 14C:
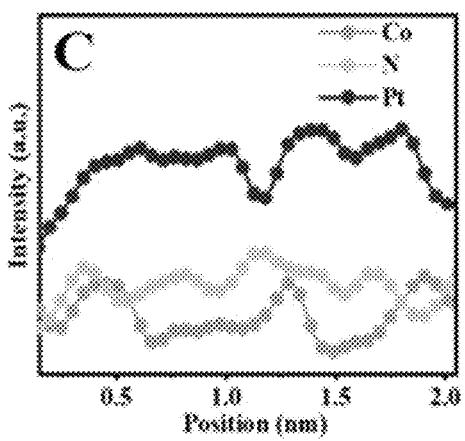
Figure 14D:
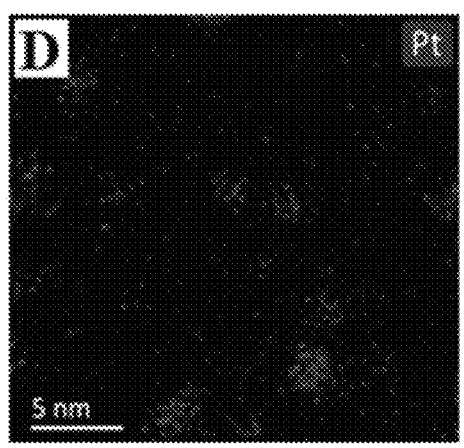
Figure 14E:
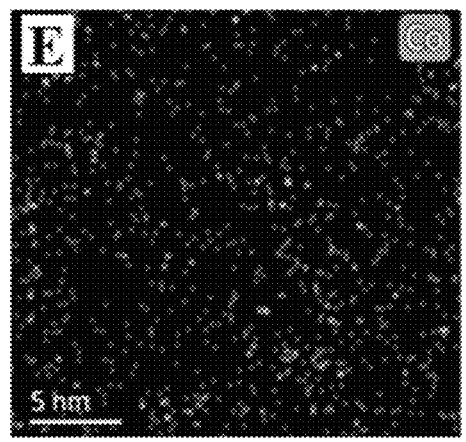
Figure 14F:
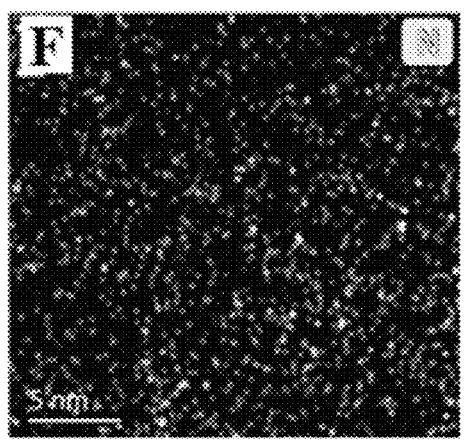
Figure 14G:
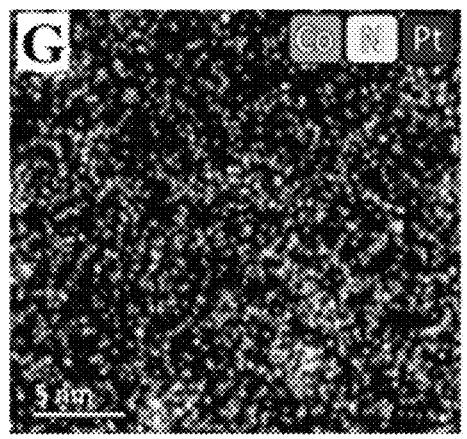

FIG. 14A shows a TEM image of the electrode catalyst prepared above, FIG. 14B shows a high-angle annular dark-field scanning transmission electron microscopy (HAADF-STEM) image thereof, and FIGS. 14C to 14G show the results of surface qualitative analysis using energy-dispersive X-ray spectroscopy (EDS).

With reference to FIGS. 14A to 14G, it can be confirmed that the platinum particles were distributed on the carbon support but that cobalt and nitrogen were uniformly distributed throughout the carbon support, regardless of the distribution of the platinum particles.

TEST EXAMPLE (1)

The electrode catalysts prepared in Preparation Example 1, Preparation Example 2 and Preparation Example 3 were subjected to X-ray diffraction (XRD) and X-ray photoelectron spectroscopy (XPS). The results thereof are shown in FIG. 15 and in Table 1 below.

TABLE 1

| Electrode catalyst | C 1s (at %) | Pt 4f (at %/wt %) | Co 2p (at %/wt %) | N 1s (at %) | O 1s (at %) |
|---|---|---|---|---|---|
| Preparation Example 1 | 87.98 | 2.06/24.50 | 0.65/2.34 | 4.77 | 4.54 |
| Preparation Example 2 | 86.52 | 1.88/21.36 | 2.26/7.75 | 3.61 | 5.73 |
| Preparation Example 3 | 88.31 | 2.13/25.32 | 0.32/1.14 | 3.30 | 5.94 |

Figure 15:
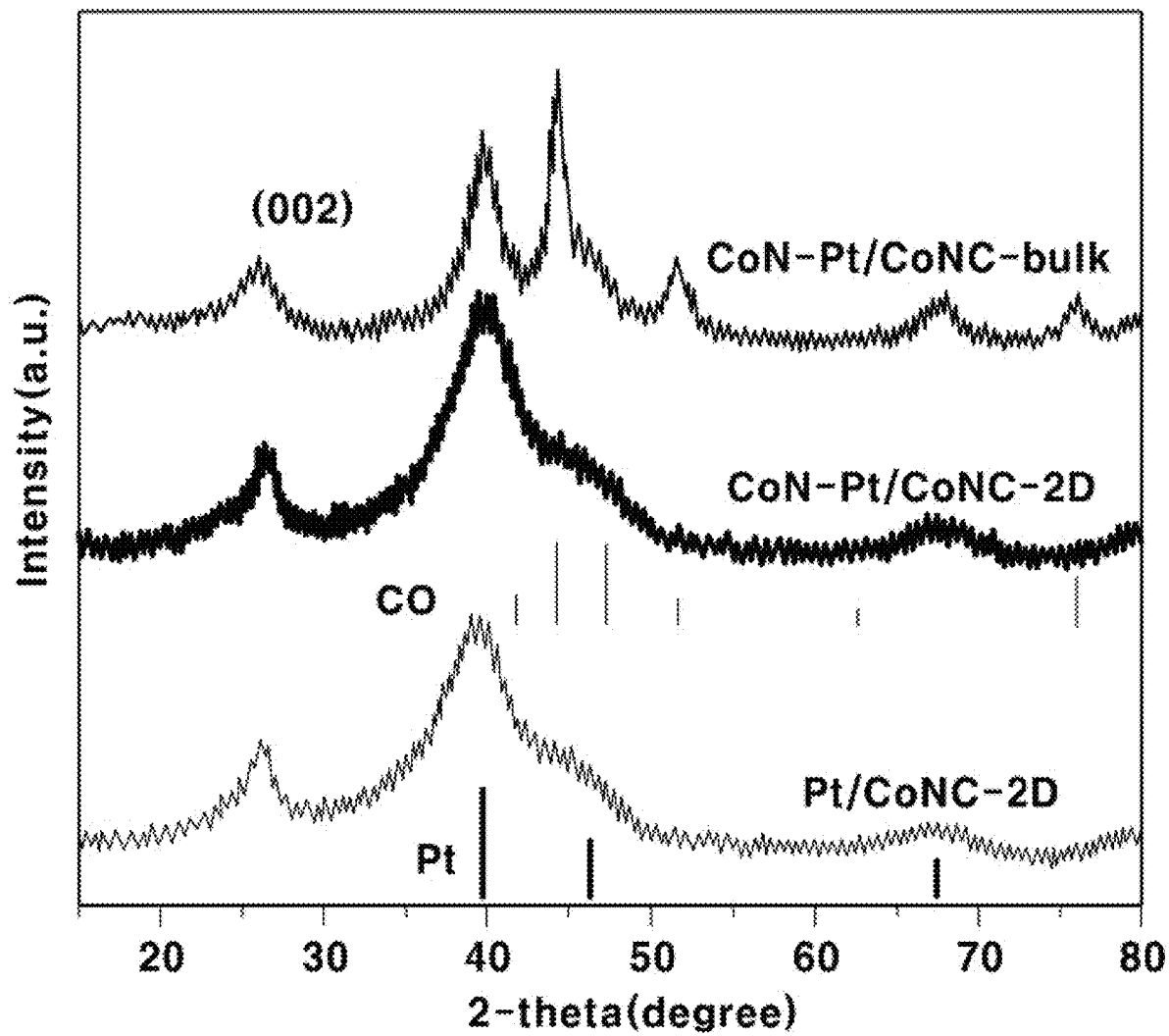
FIG. 15 is a graph showing the results of Test Example 1.

With reference to FIG. 15, in Preparation Example 2, cobalt metal was provided on the carbon support despite the hydrothermal reaction in the hydrochloric acid aqueous solution, and the diffractive pattern of platinum was not different from the reference pattern, indicating that platinum and cobalt were not alloyed but were present individually. In Preparation Example 1 and Preparation Example 3, cobalt metal was not provided on the carbon support but the diffractive pattern of platinum was not different from the reference pattern, indicating that platinum was present alone. In particular, in Preparation Example 2, since platinum was not alloyed with cobalt metal but cobalt nitride was distributed on the surface of platinum, the diffractive pattern of platinum was not changed.

Based on the results of Table 1, in Preparation Example 1, in which platinum was present along with cobalt nitride, cobalt and nitrogen were included in large amounts compared to Preparation Example 3, in which the platinum particles were present alone. In Preparation Example 2, the reason why the cobalt content was very high was that cobalt metal accumulated on polyhedral carbon and thus cobalt metal particles did not react but remained on the carbon support in the platinum supporting process and the hydrothermal reaction in the hydrochloric acid aqueous solution.

TEST EXAMPLE (2)

The specific surface area (FIG. 16A) of the electrode catalysts prepared in Preparation Example 1 and Preparation Example 2 and the pores therein (FIG. 16B) were measured. The results thereof are shown in FIGS. 16A and 16B.

Figure 16A:
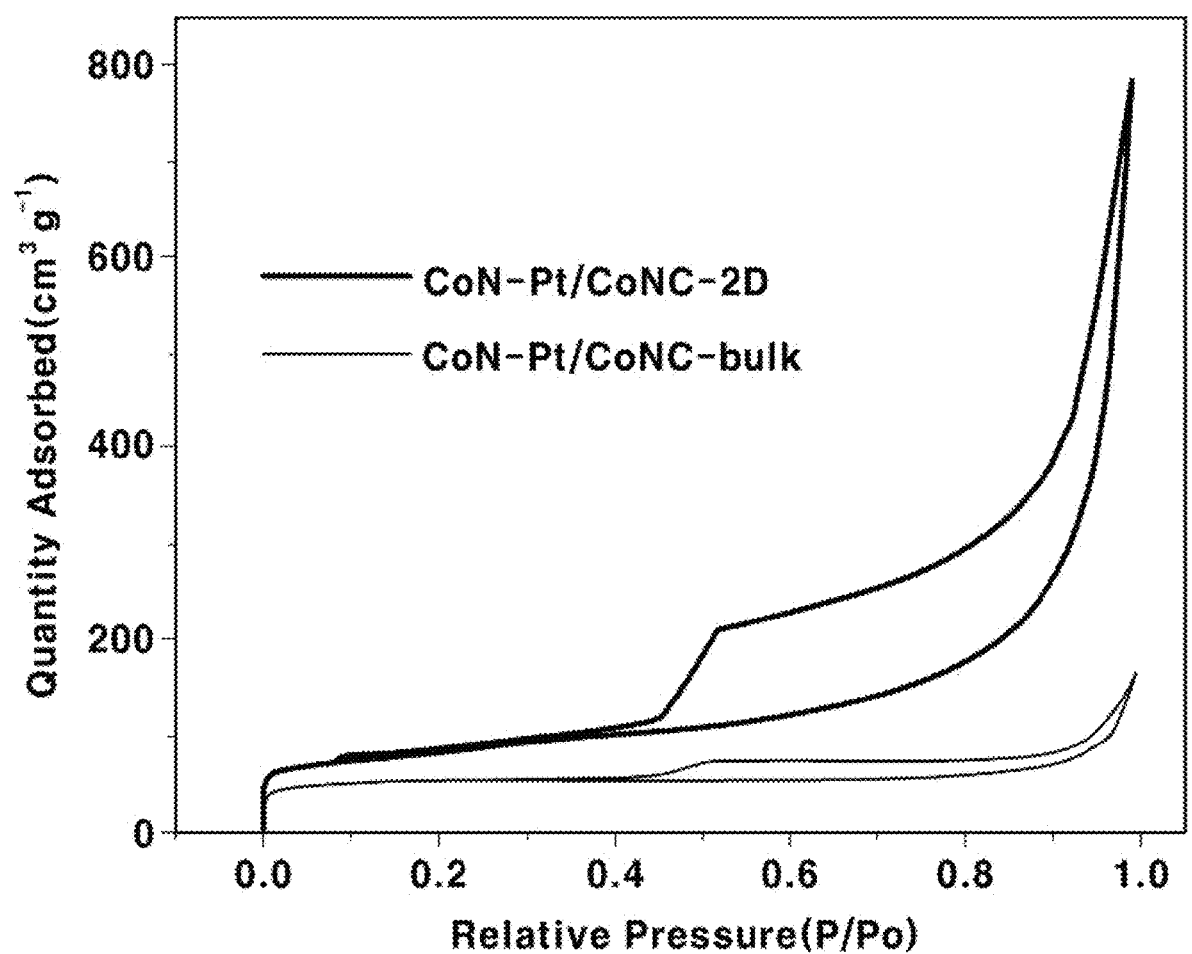
FIGS. 16A and 16B are graphs showing the results of Test Example 2.
Figure 16B:
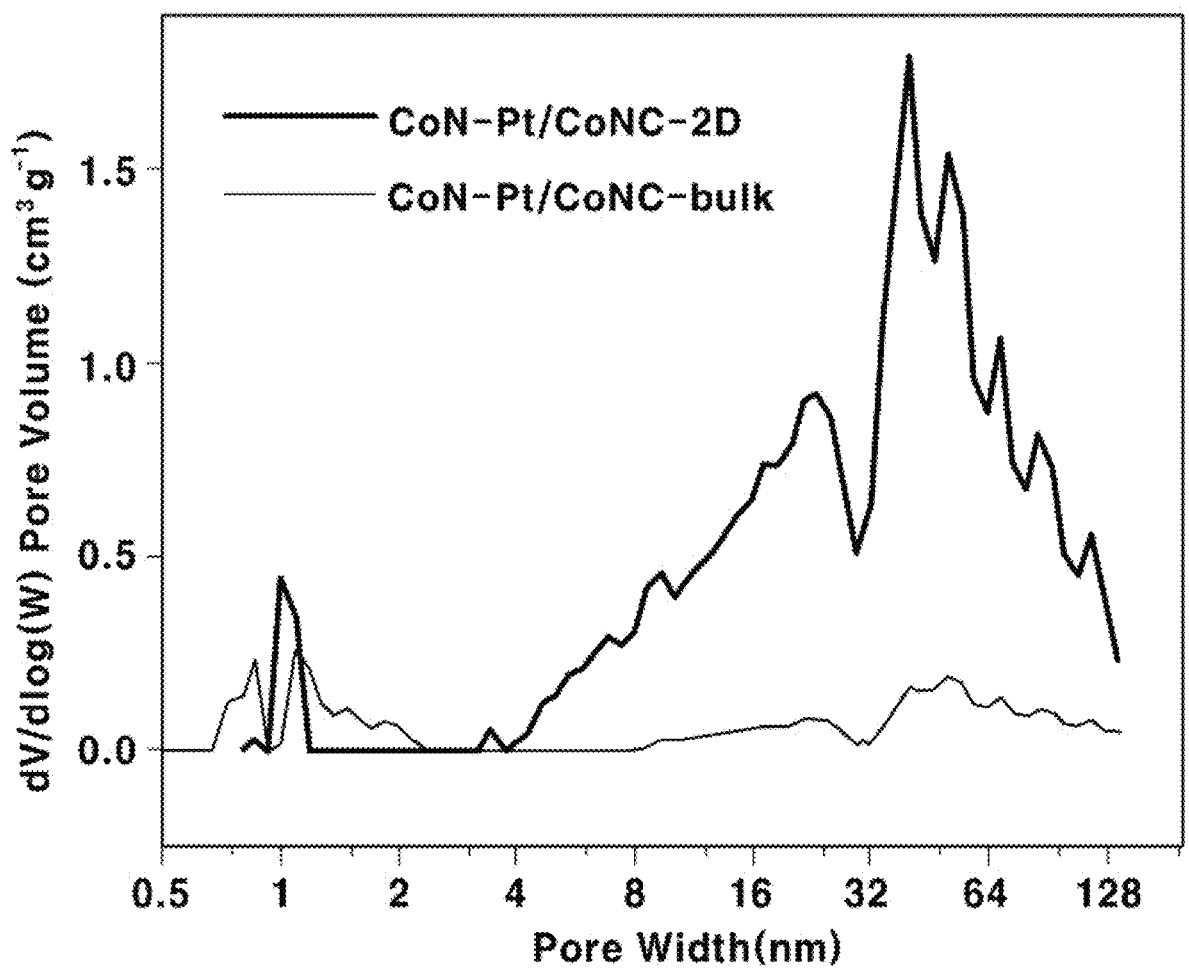

With reference to FIG. 16A, in Preparation Example 1 and Preparation Example 2, both micropores and mesopores were present, and in Preparation Example 1, macropores were also present, based on the adsorption/desorption near relative pressure of 1.0. Thus, Preparation Example 1 had a specific surface area of 287.8 m$^2$/g and Preparation Example 2 had a specific surface area of 202.3 m$^2$/g. With reference to FIG. 16B, Preparation Example 1 included micropores having an average size of 1.2 nm (54.2 m$^2$/g), mesopores having a size of 4 to 50 nm, and macropores having a size of 50 to 128 nm, the ratio of micropores relative to the specific surface area being 19%. Preparation Example 2 included micropores having a size of 0.6 to 2 nm (163.7 m$^2$/g) and limited mesopores, the ratio of micropores relative to the specific surface area being 81%.

TEST EXAMPLE (3)

Compared with a platinum catalyst (Pt/C) supported on a carbon support (hereinafter referred to as Comparative Example 1), which is usually applied to a fuel cell, the electrode catalyst of each of Preparation Example 1, Preparation Example 2 and Preparation Example 3 was measured for the activity of an oxygen reduction reaction (ORR), which is a half reaction of the fuel cell, in a 3-electrode system (reference electrode: platinum wire; counter electrode: KCl saturated Ag/AgCl; working electrode: Preparation Example 1, Preparation Example 2, Preparation Example 3 and Comparative Example 1) using 0.1 M HClO$_4$ electrolyte saturated with oxygen. The results thereof are shown in FIGS. 17A to 17F.

Figure 17A:
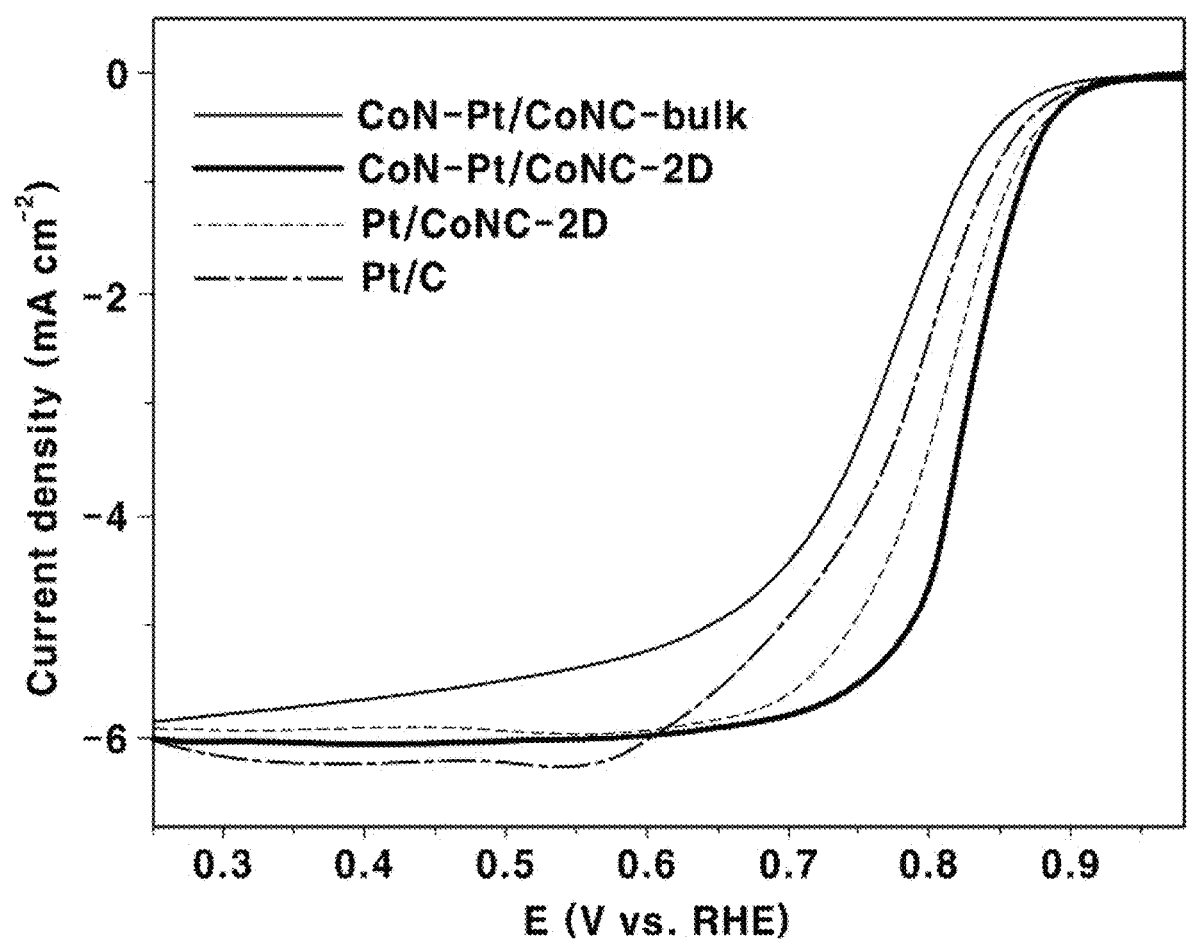
FIGS. 17A to 17F are graphs showing the results of Test Example 3.
Figure 17B:
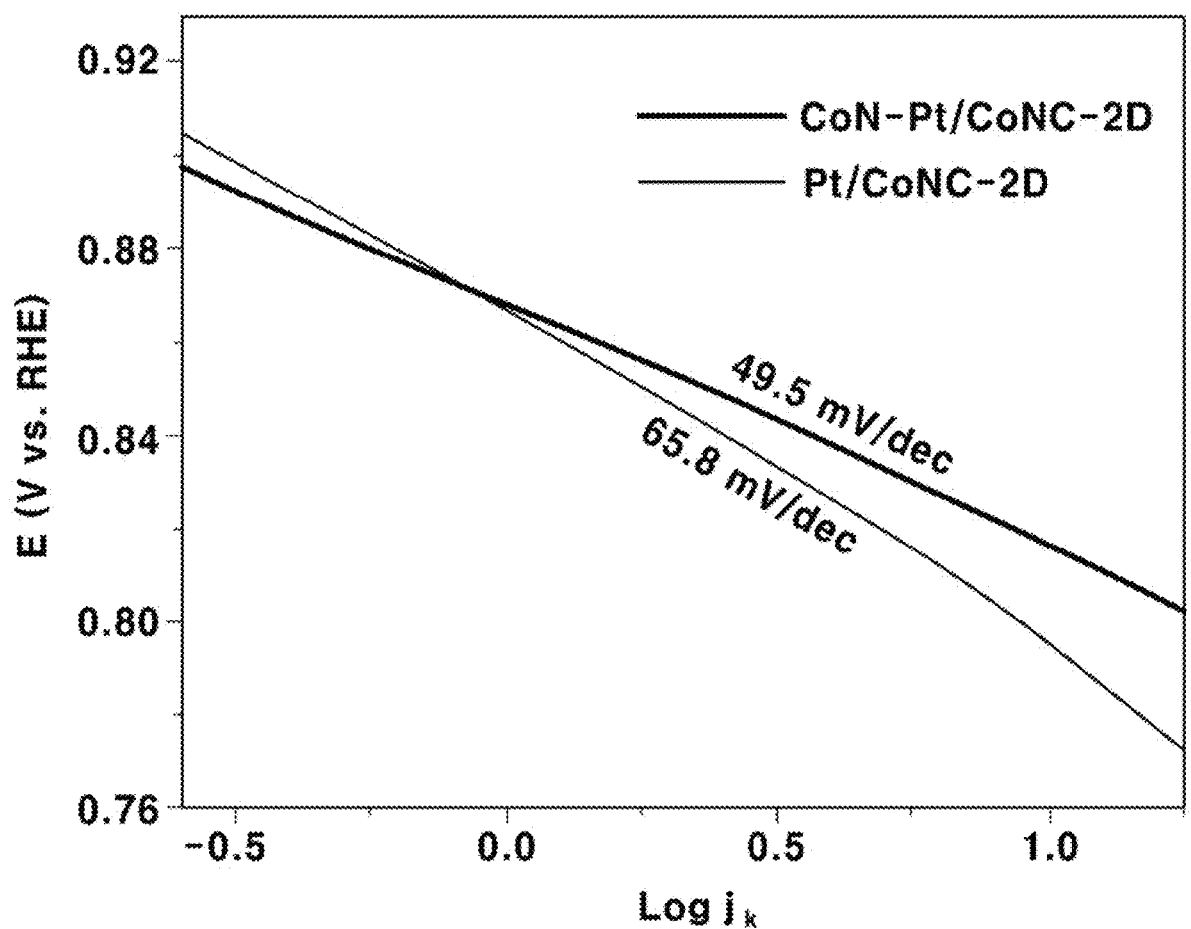
Figure 17C:
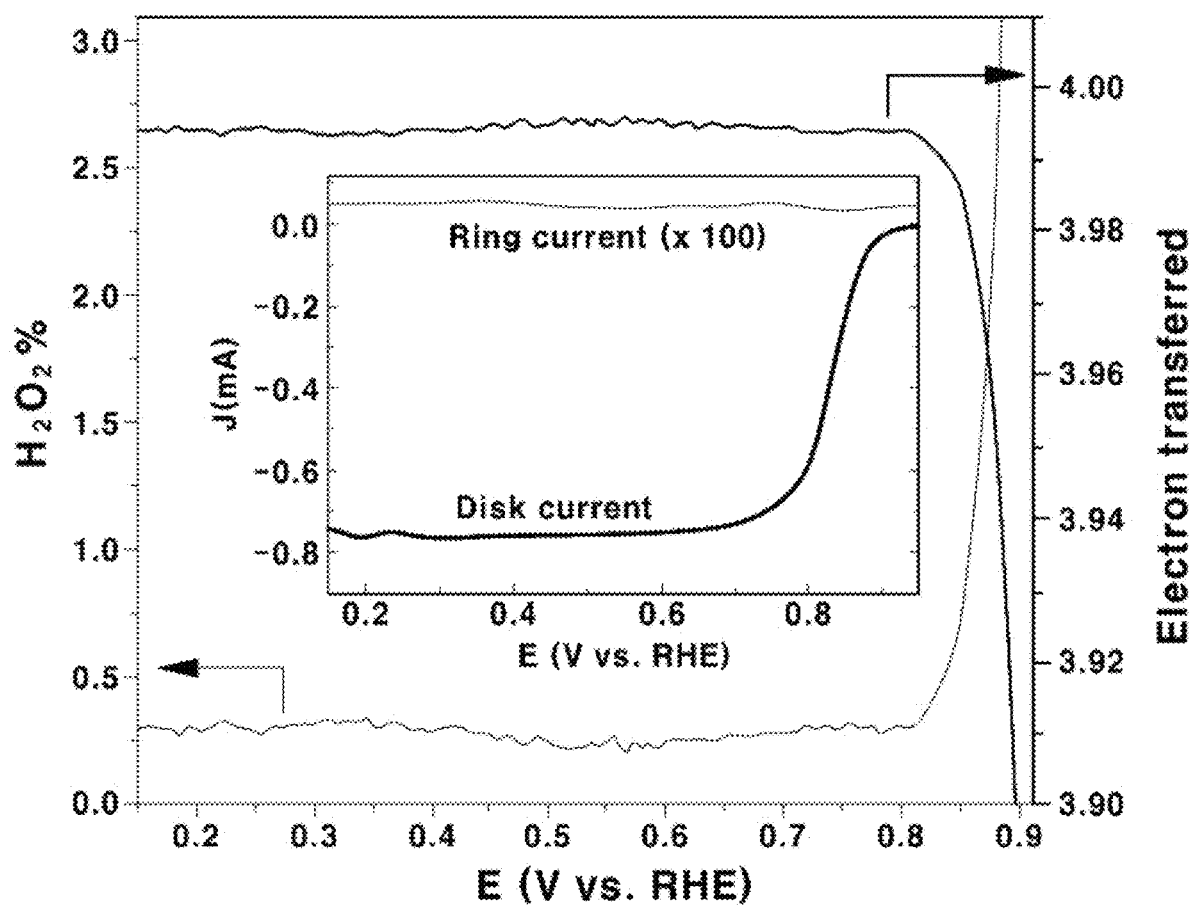
Figure 17D:
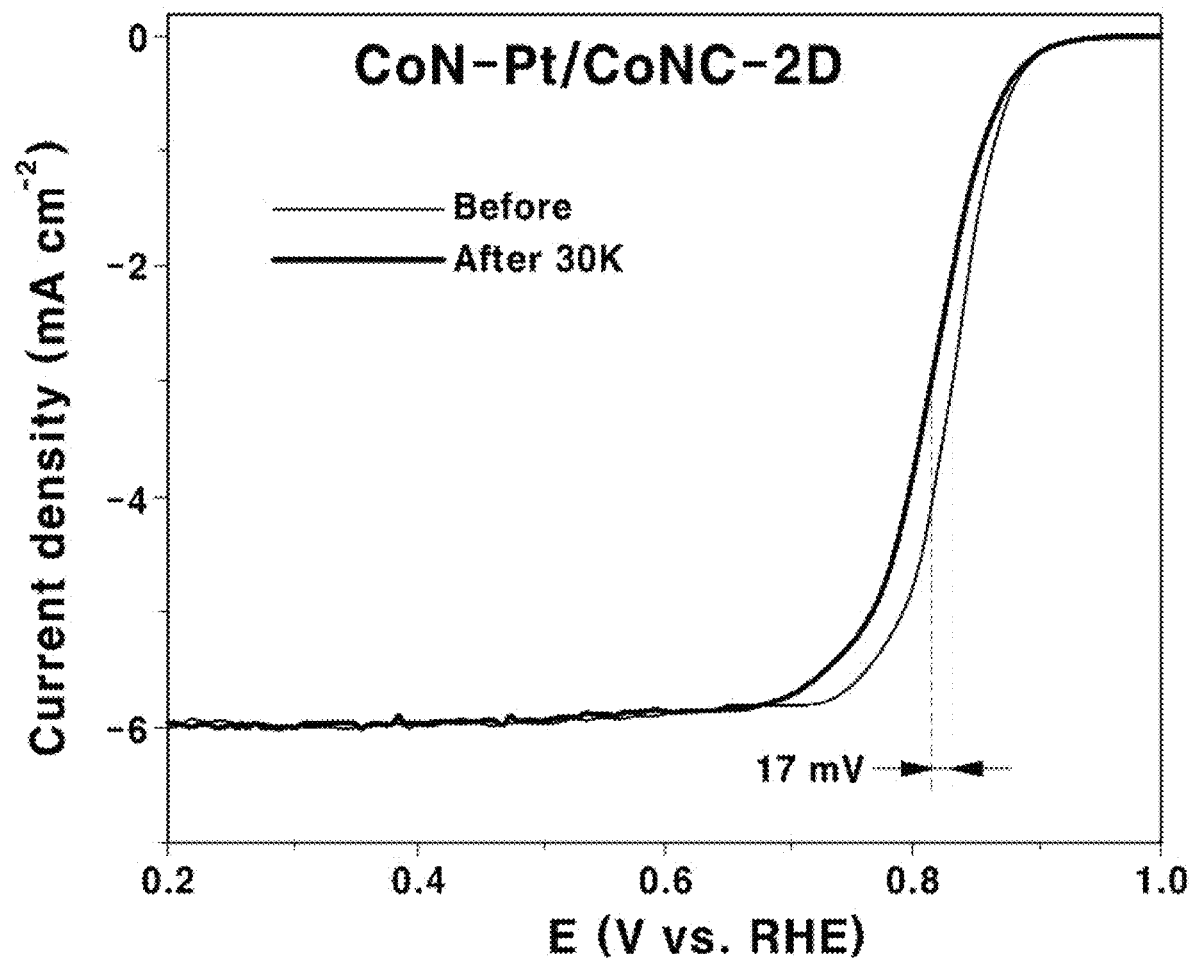
Figure 17E:
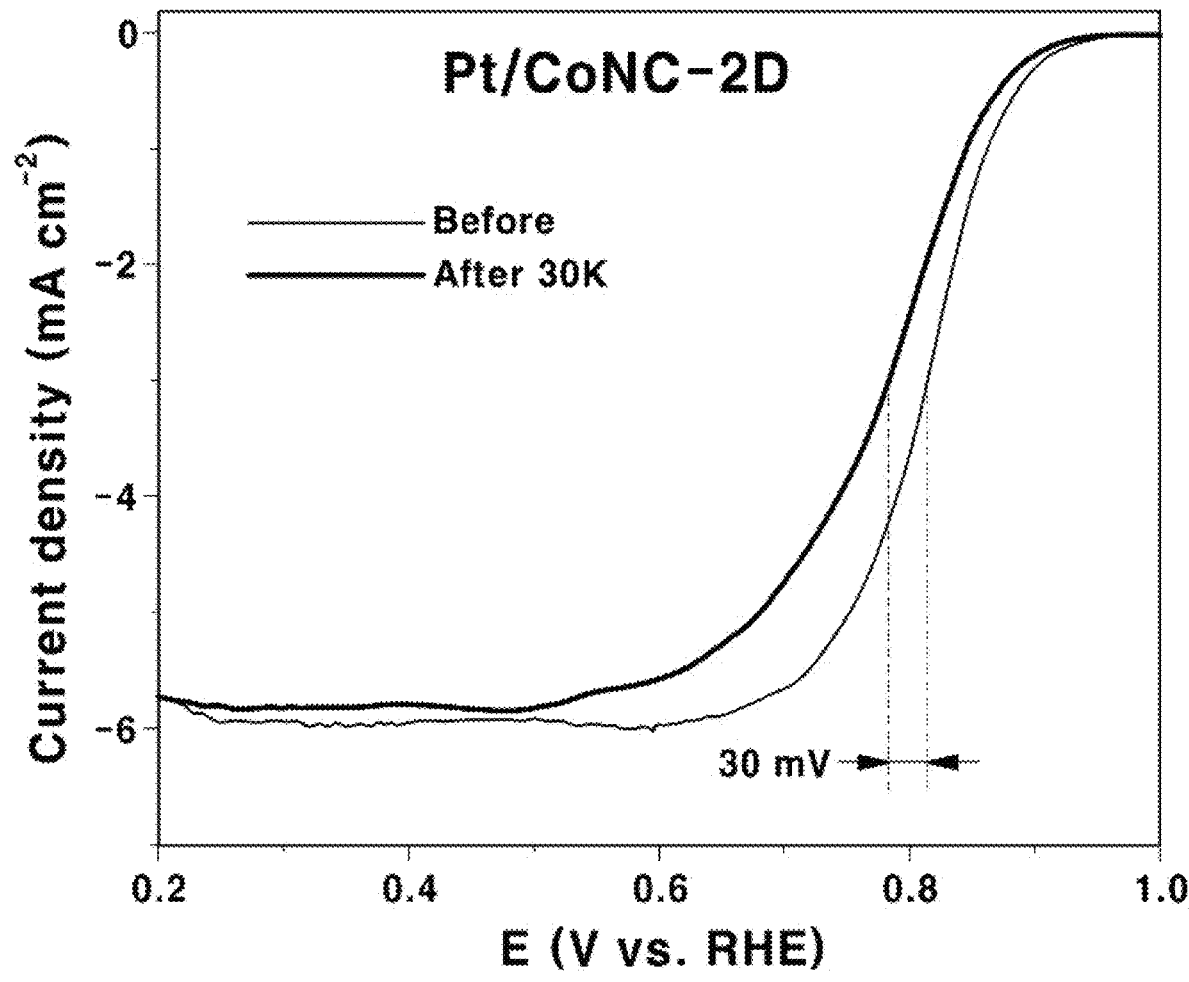
Figure 17F:
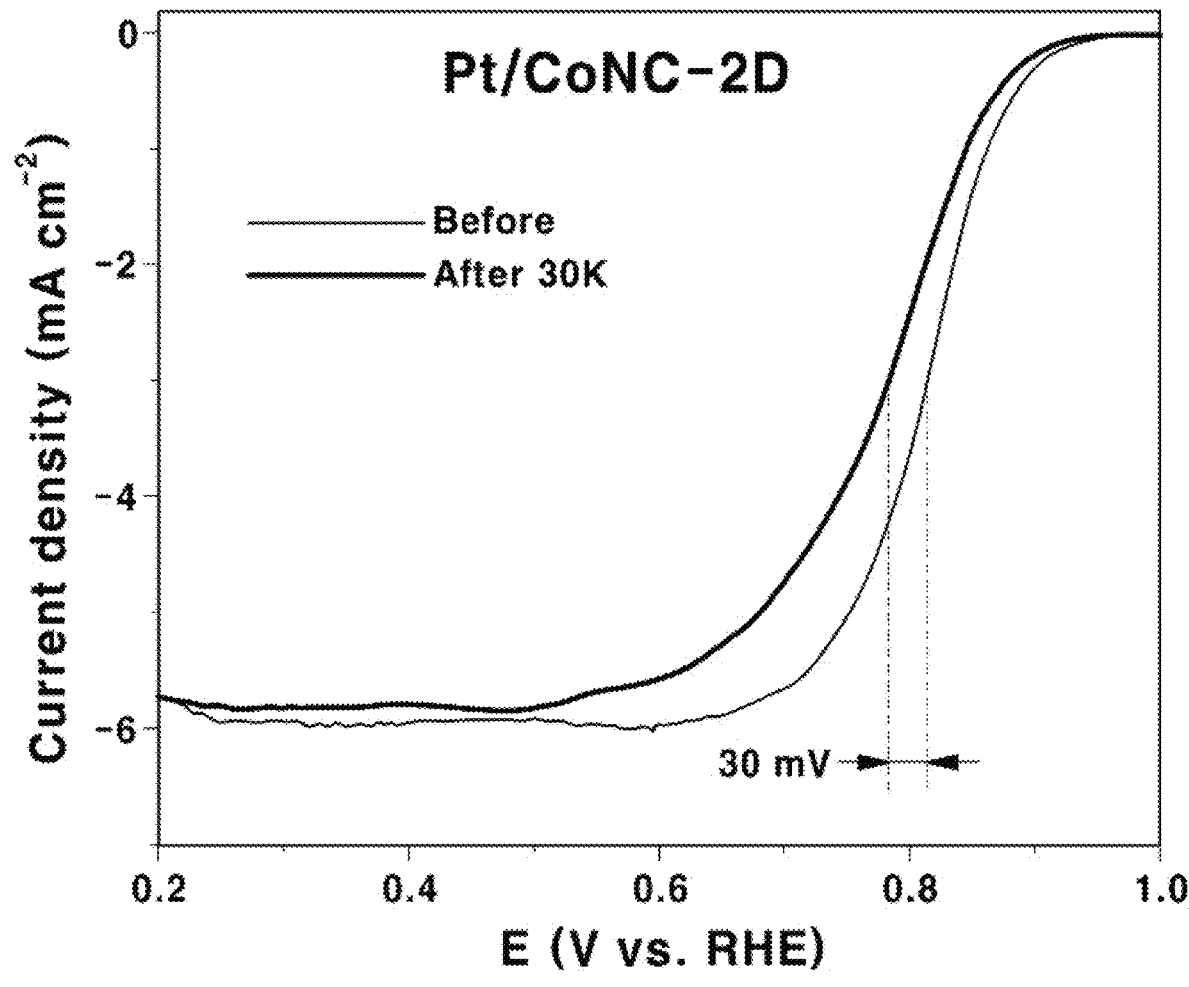

FIG. 17A is a linear sweep voltammetry (LSV) graph showing the current density of a rotating disk at 1600 rpm in the presence of the catalyst of each of Preparation Example 1 to Preparation Example and Comparative Example 1, FIG. 17B shows the Tafel plots of Preparation Example 1 and Preparation Example 3, and FIG. 17C is graphs showing the production of hydrogen peroxide (H$_2$O$_2$) and the number of electrons transferred per oxygen molecule for the oxygen reduction reaction, calculated based on the current density of the rotating ring disk at 1600 rpm. FIGS. 17D, 17E and 17F are LSV graphs showing changes in current density of the rotating ring disk at 1600 rpm before and after an accelerated durability test (ADT) for the electrode catalysts of Preparation Example 1, Preparation Example 3 and Comparative Example 1.

Based on the results of FIG. 17A, by comparing the starting voltage (Eonset), the half-wave voltage (E1/2) and the threshold current density, it can be seen that the ORR activity of Preparation Example 1 was excellent. Based on the results of FIG. 17B, in the kinetic region of the ORR catalyst reaction, Preparation Example 1 exhibited 49.5 mV/dec, which is a Tafel slope smaller than Preparation Example 3 (65.8 mV/dec), thus enabling faster electron transfer. Based on the results of FIG. 17C, the number of electrons transferred during the catalyst reaction at 0.15 to 0.8 V in Preparation Example 1 was 3.99, and the production of hydrogen peroxide, a product of the 2-electron ORR reaction, was 0.26% or less, so the ORR of the 4-electron reaction was the main catalyst reaction. The results of FIGS. 17D, 17E and 17F confirmed the change in LSV due to the deterioration in the performance of the electrode catalyst after ADT. Preparation Example 1 was the most stable because the change in half-wave voltage (E1/2) was 17 mV in Preparation Example 1, 30 mV in Preparation Example 3, and 36 mV in Comparative Example 1.

Thereby, it can be found that the cobalt nitride on the surface of platinum improved the ORR activity and stability.

TEST EXAMPLE (4)

Figure 18A:
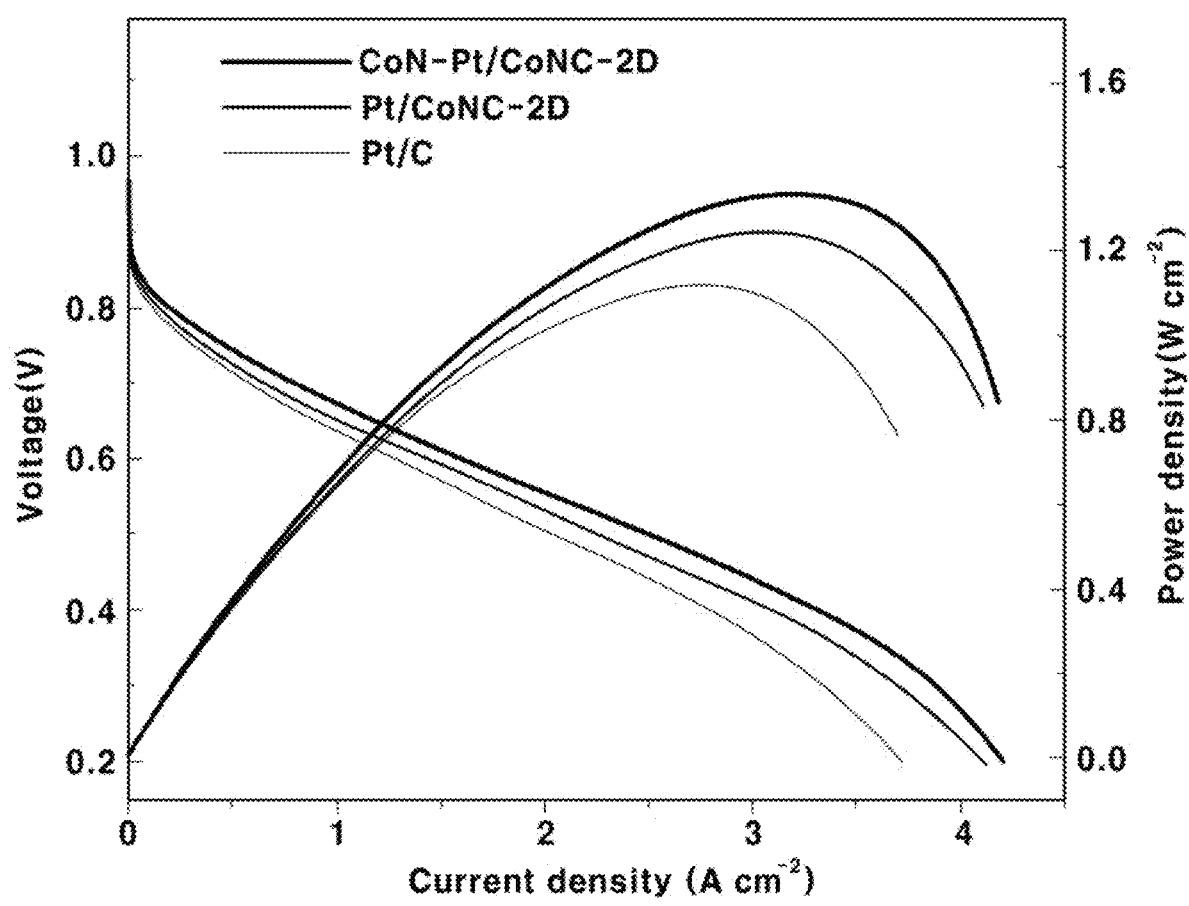
FIGS. 18A and 18B are graphs showing the results of Test Example 4.
Figure 18B:
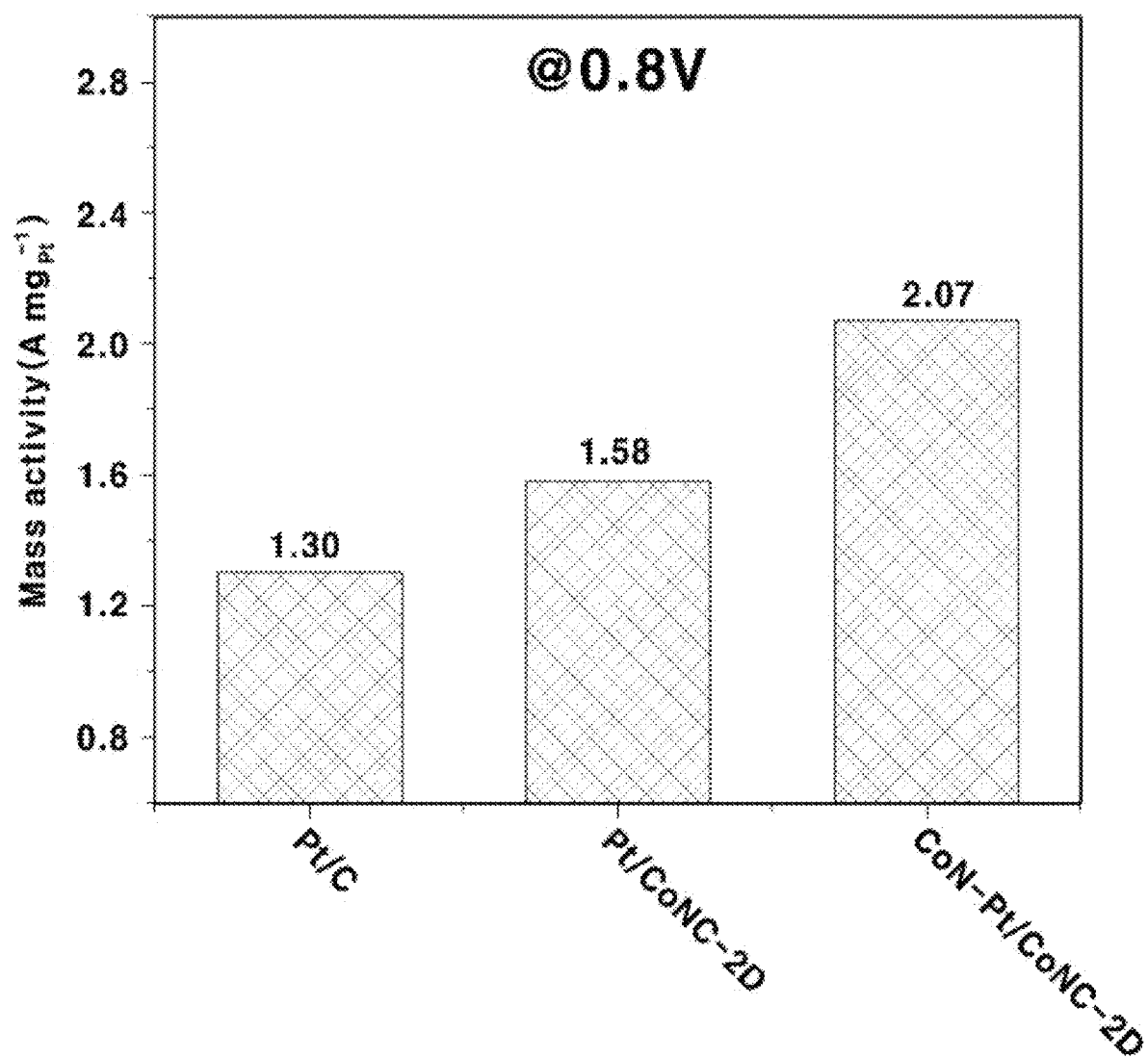

FIGS. 18A and 18B are graphs showing a current-voltage polarization curve and power density in the presence of hydrogen/oxygen fuel and current per unit mass of platinum at 0.8 V of the corresponding polarization curve in an oxygen reduction reaction (ORR) electrode, which is a cathode of a membrane-electrode assembly of a fuel cell, manufactured using the electrode catalyst of each of Preparation Example 1, Preparation Example 3 and Comparative Example 1.

In this experiment, the electrode catalyst of Comparative Example 1 was used for the anode, and in each evaluation, the platinum content in both the anode and the cathode was 0.1 mg$_{pt}$/cm$^2$, and NR211 was used as the electrolyte membrane. The current-voltage polarization curve and the power density graph were determined under conditions of 0.5 bar of hydrogen and oxygen.

Based on the results of FIG. 18A, the maximum power density was 1.33 W/cm$^2$ in Preparation Example 1, 1.24 W/cm$^2$ in Preparation Example 3, and 1.10 W/cm$^2$ in Comparative Example 1, and the current per unit electrode area at 0.8 V was 0.207 A/cm$^2$ in Preparation Example 1, 0.158 A/cm$^2$ in Preparation Example 3, and 0.130 A/cm$^2$ in Comparative Example 1, indicating that Preparation Example 1 exhibited excellent membrane-electrode assembly activity. Based on the results of FIG. 18B, Preparation Example 1 manifested excellent current per unit mass of platinum at 0.8 V. Thereby, it can be found that the cobalt nitride on the surface of platinum improved the ORR activity in the membrane-electrode assembly.

TEST EXAMPLE (5)

FIGS. 19A, 19B, 19C and 19D are a current change graph, a current-voltage polarization curve at the initial stage and after 100 hr, a power density graph at the initial stage and after 100 hr, and a current graph per unit mass of platinum at 0.8 V at the initial stage and after 100 hr, respectively, when a current per unit electrode area of 1 Acm$^{-2}$ was maintained for 100 hr in the presence of hydrogen/oxygen fuel in an oxygen reduction reaction (ORR) electrode, which is a cathode of a membrane-electrode assembly of a fuel cell, manufactured using the electrode catalyst of each of Preparation Example 1 and Comparative Example 1.

In this experiment, the electrode catalyst of Comparative Example 1 was used for the anode, and in each evaluation, the platinum content in both the anode and the cathode was 0.1 mg$_{pt}$/cm$^2$, and NR211 was used as the electrolyte membrane. The current-voltage polarization curve and the power density graph were determined in the presence of 0.5 bar of hydrogen and oxygen.

Figure 19A:
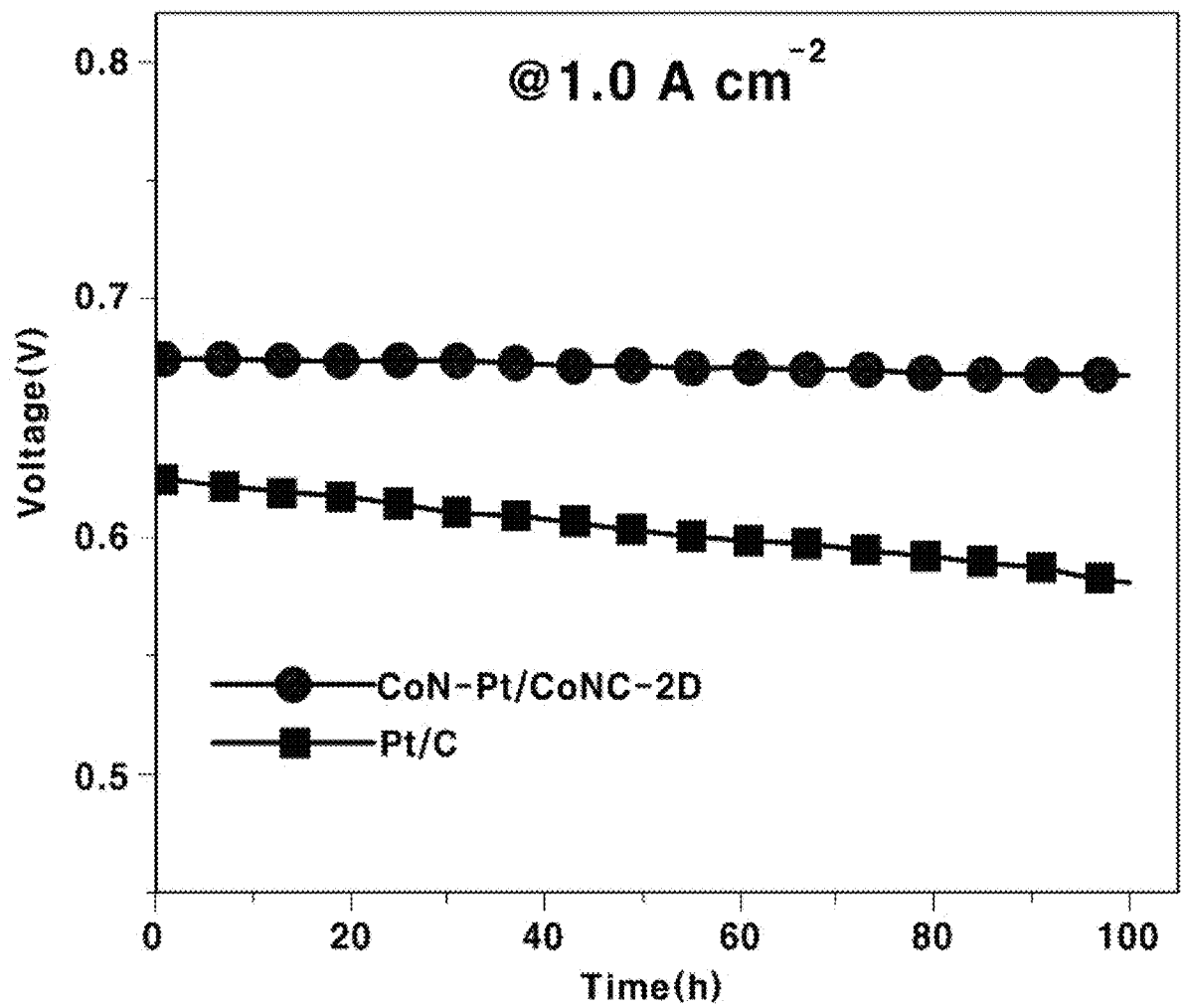
FIGS. 19A to 19D are graphs showing the results of Test Example 5.
Figure 19B:
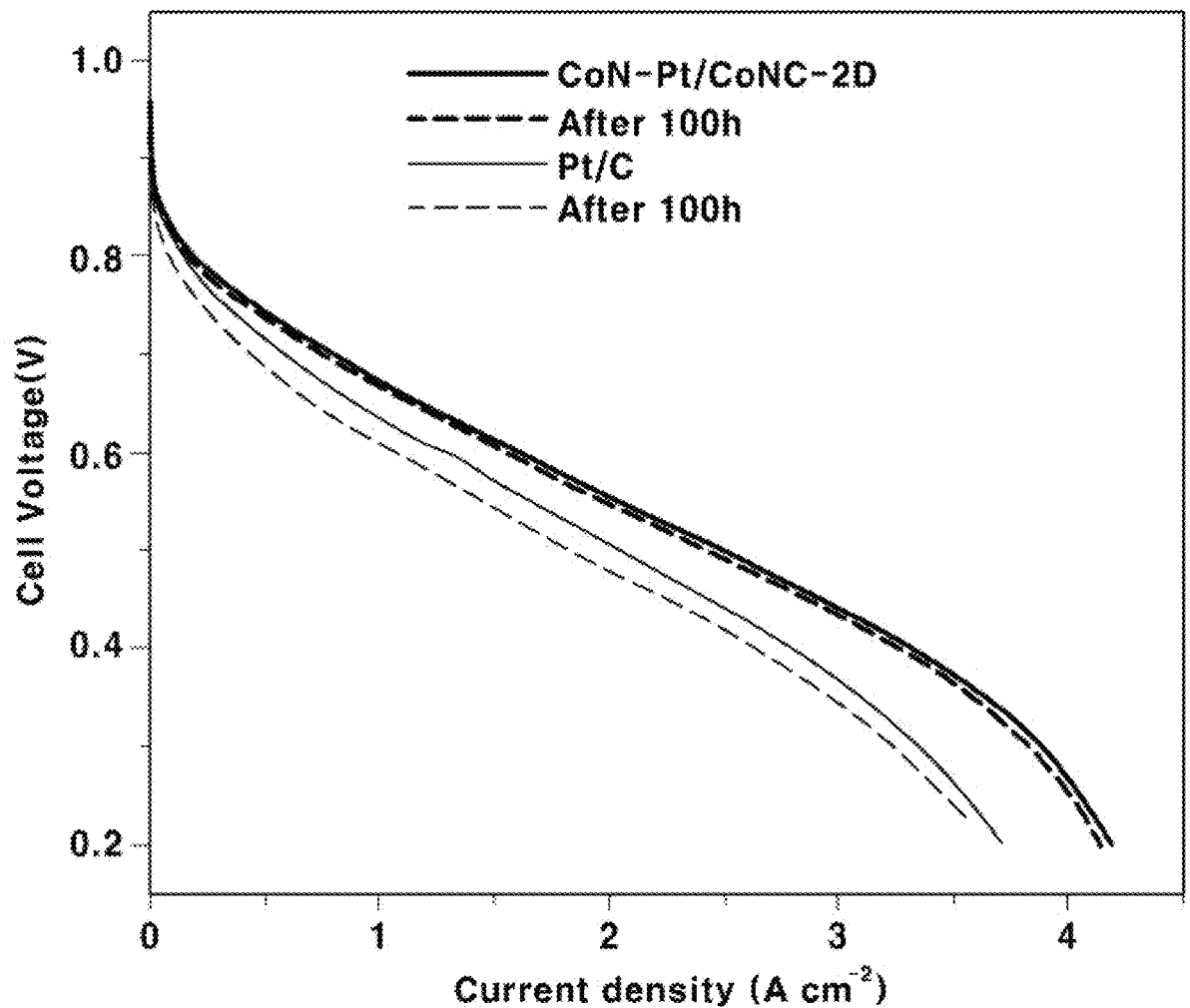
Figure 19C:
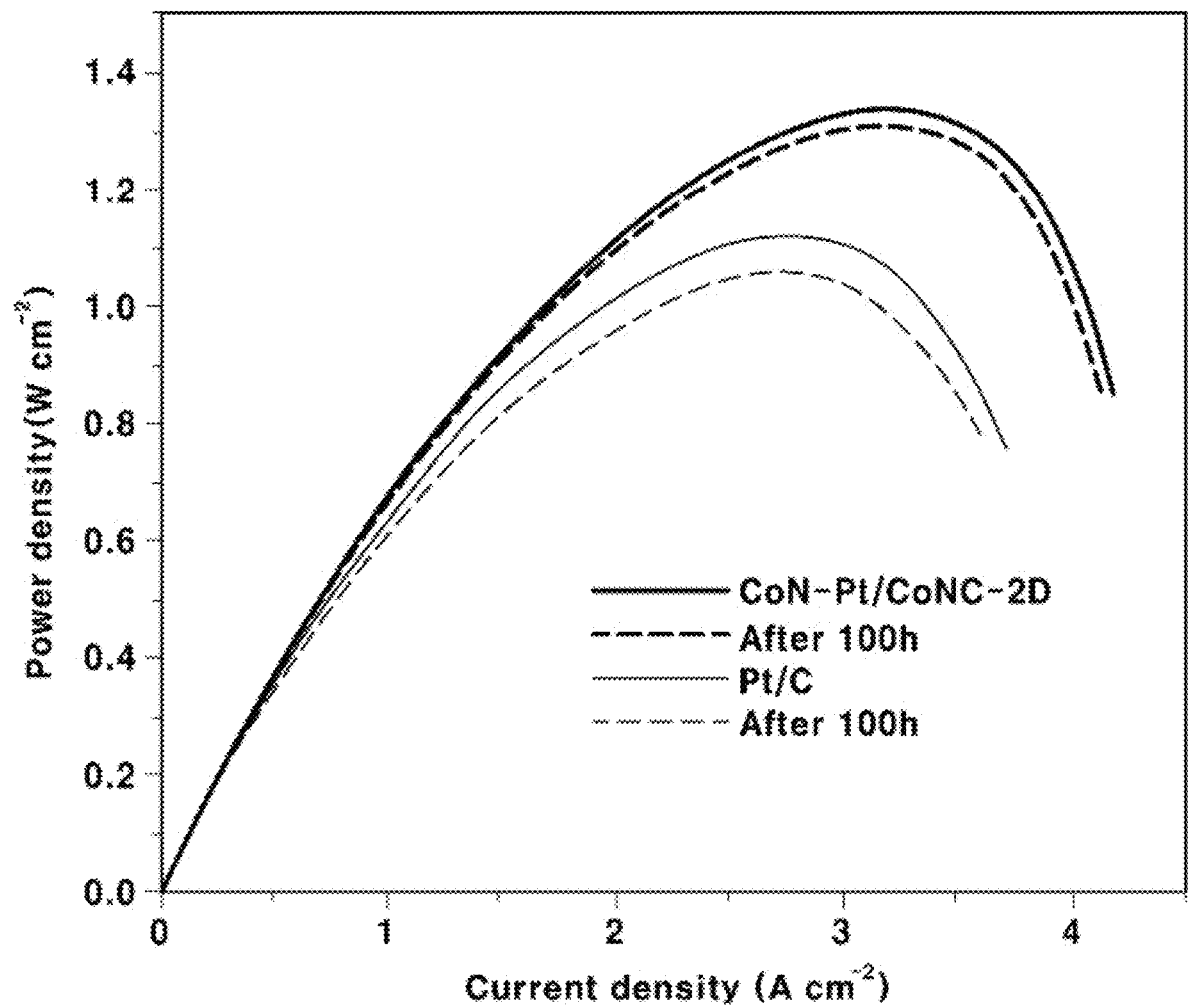
Figure 19D:
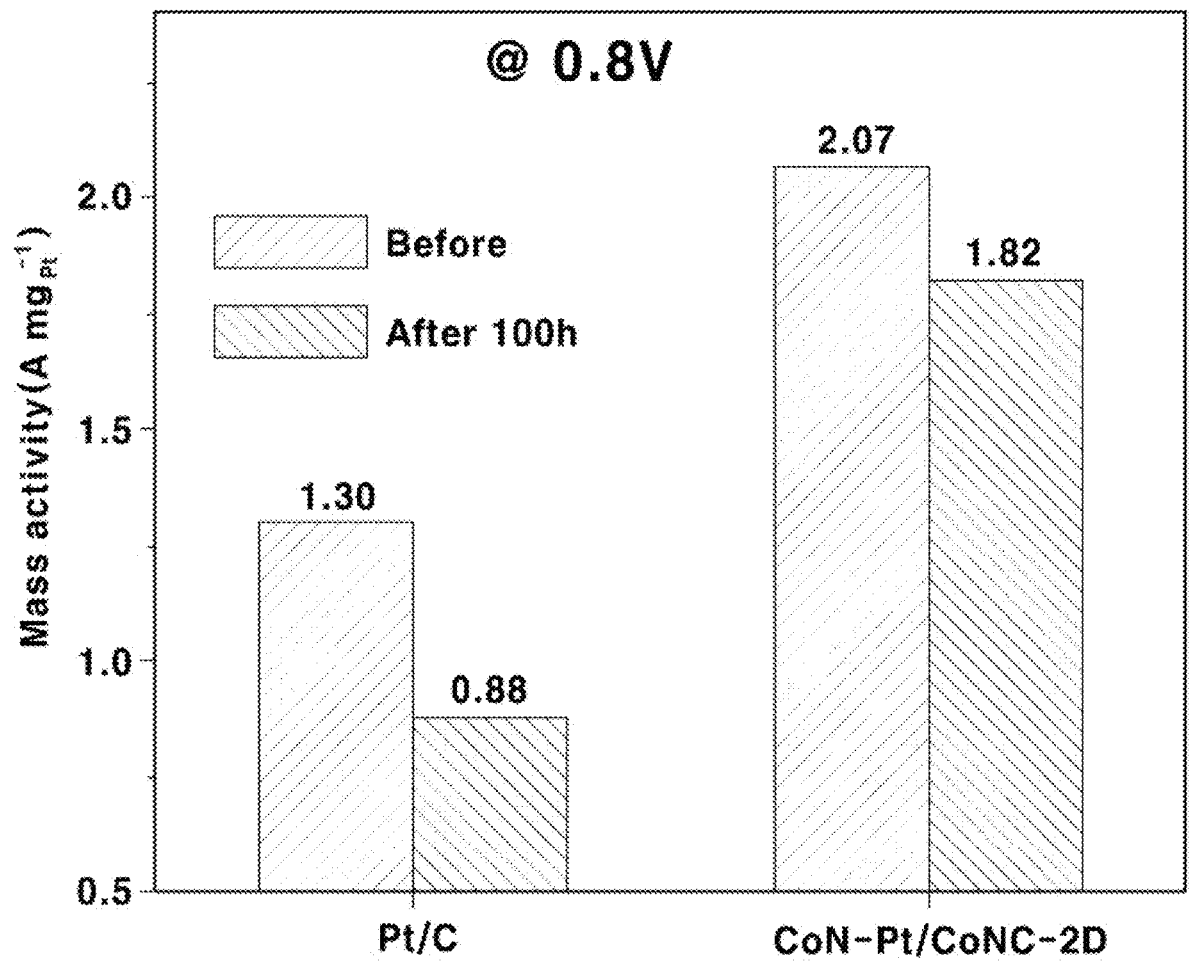

As shown in FIG. 19A, the voltage at 1 A/cm$^2$ for 100 hr was decreased by 1.0% in Preparation Example 1 and by 6.7% in Comparative Example 1, indicating that Preparation Example 1 was more stable. As shown in FIG. 19B, the current per unit electrode area at 0.8 V was 0.182 A/cm$^2$ in Preparation Example 1 and 0.088 A/cm$^2$ in Comparative Example 1, and as shown in FIG. 19C, the maximum power density was 1.31 W/cm$^2$ in Preparation Example 1 and 1.06 W/cm$^2$ in Comparative Example 1. As shown in FIG. 19D, the current reduction rate per unit mass of platinum at 0.8 V after 100 hr for current per unit electrode area of 1 A/cm$^2$ was 11.9% in Preparation Example 1 and 32.7% in Comparative Example 1, based on which the cobalt nitride on the surface of platinum was determined to improve ORR stability in the membrane-electrode assembly.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A method of preparing a catalyst, the method comprising:
    preparing a support by synthesizing a metal precursor and alkyl imidazole;
    adding the support and cobalt nitrate to a solvent and carrying out a hydrothermal reaction;
    preparing a carbon support by subjecting the support to primary heat treatment;
    adding the carbon support to a solvent along with platinum and subjecting the carbon support to secondary heat treatment for supporting platinum with doped-nitrogen on the surface of the carbon support;
    purifying the carbon support by removing one or more pure non-noble metal particles from the carbon support and remaining non-noble metal particles attached on the platinum particles through acid treatment; and
    subjecting the carbon support to tertiary heat treatment,
    wherein the synthesizing comprises:
    supplying a first aqueous solution of dissolved the metal precursor, and mixing it with a second aqueous solution of the alkyl imidazole with stirring,
    wherein the one or more metal particles comprise non-noble metal particles which is formed by primary heat treatment.

2. The method of claim 1, wherein the support comprises ZIF-67, which is a zeolitic imidazolate framework.

3. The method of claim 1, wherein the primary heat treatment is performed at a temperature of 25° C. to 1000° C. for 10 minutes to 300 minutes in an inert gas atmosphere, and the secondary heat treatment is performed at a temperature of 60° C. to 100° C. for 2 hours to 10 hours at a proton concentration (pH) of 7 or less.

4. The method of claim 1, wherein the support subjected to the primary heat treatment comprises cobalt particles on a surface thereof.

5. The method of claim 1, wherein the carbon support subjected to secondary heat treatment comprises, on a surface thereof, particles selected from the group consisting of cobalt, nickel, platinum and combinations thereof.

6. The method of claim 1, wherein the acid treatment is performed at a temperature of 90° C. to 120° C. for 1 to 3 hours in a hydrochloric acid aqueous solution.

7. The method of claim 1, wherein the one or more metal particles removed from the carbon support through acid treatment comprise pure cobalt not bound to platinum.

8. The method of claim 1, wherein the tertiary heat treatment is performed at a temperature of 300° C. to 600° C. for 10 minutes to 60 minutes in an ammonia gas atmosphere.

* * * * *